US009554395B2

(12) United States Patent
Mizusawa

(10) Patent No.: US 9,554,395 B2
(45) Date of Patent: *Jan. 24, 2017

(54) COMMUNICATION CONTROL DEVICE, COMMUNICATION CONTROL METHOD, TERMINAL DEVICE, PROGRAM, AND COMMUNICATION CONTROL SYSTEM

(71) Applicant: SONY CORPORATION, Tokyo (JP)

(72) Inventor: Nishiki Mizusawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/920,062

(22) Filed: Oct. 22, 2015

(65) Prior Publication Data

US 2016/0044696 A1    Feb. 11, 2016

Related U.S. Application Data

(63) Continuation of application No. 14/359,809, filed as application No. PCT/JP2013/074371.

(30) Foreign Application Priority Data

Nov. 2, 2012    (JP) .................................. 2012-242598

(51) Int. Cl.
*H04J 3/00*     (2006.01)
*H04W 72/12*    (2009.01)
(Continued)

(52) U.S. Cl.
CPC ............ *H04W 72/12* (2013.01); *H04L 1/1854* (2013.01); *H04L 1/1861* (2013.01); *H04L 5/14* (2013.01);
(Continued)

(58) Field of Classification Search
CPC ...................................................... H04L 5/1438
(Continued)

(56) References Cited

U.S. PATENT DOCUMENTS

2011/0164515 A1*  7/2011  Park ...................... H04L 1/0061
                                                        370/252
2014/0204813 A1*  7/2014  Yang ...................... H04L 5/001
                                                        370/280

FOREIGN PATENT DOCUMENTS

WO    WO 2012/113131 A1    8/2012

OTHER PUBLICATIONS

International Search Report issued Oct. 8, 2013 in PCT/JP2013/074371.
(Continued)

*Primary Examiner* — Iqbal Zaidi
(74) *Attorney, Agent, or Firm* — Oblon, McClelland, Maier & Neustadt, L.L.P.

(57) ABSTRACT

Provided is a communication control device that controls radio communication conducted by a terminal device according to a time-division duplex (TDD) scheme on a radio communication network, the communication control device including a configuration section that configures, for each frame that includes a plurality of subframes, a link direction configuration expressing a link direction per subframe for the radio communication. The configuration section configures a timing of control signaling in a second link direction which is associated with data transmission in a first link direction in the radio communication, and which is opposite to the first link direction, independently of the configured link direction configuration.

28 Claims, 16 Drawing Sheets

(51) Int. Cl.
  H04L 1/18      (2006.01)
  H04W 72/04     (2009.01)
  H04L 5/14      (2006.01)
  H04L 5/00      (2006.01)

(52) U.S. Cl.
  CPC ........ *H04L 5/1469* (2013.01); *H04W 72/0446* (2013.01); *H04L 5/0055* (2013.01); *H04L 5/1438* (2013.01)

(58) Field of Classification Search
  USPC .............................................. 370/280–339
  See application file for complete search history.

(56) References Cited

OTHER PUBLICATIONS

"Semi-static reconfiguration of TDD UL-DL configuration", Samsung, 3GPP TSG RAN WG1 Meeting #69, R1-122266, May 2012, pp. 1-2.
"3GPP TS 36.211 V10.0.0", 3$^{rd}$ Generation Partnership Project, Dec. 2010, pp. 1-103.
Discussion on HARQ and UL-grant timing with dynamic TDD UL-DL configuration, Alcatel-Lucent Shanghai Bell, 3GPP TSG RAN WG1 Meeting #68bis, R1-121260, Mar. 2012, pp. 1-6.
"Draft TP for TR36.828 section 7", CATT, (http://ww.3gpp.org/ftp/tsg_ran/WG1_RL1/TSGR1_69/Docs/R1-122064.zip), 3GPP TSG RAN WG1 Meeting #69, R1-122064, May 25, 2012, 2 Pages.
Methods to support different UL/DL reconfiguration time scales for FS_LTE_TDD_eIMTA, CATT, (http://ww.3gpp.org/ftp/tsg_ran/WG1_RL1/TSGR1_69/Docs/R1-12206.zip), 3GPP TSG RAN WG1 Meeting #69, R1-122062, May 25, 2012, pp. 1-3.
"Methods to support different time scales for TDD UL-DL reconfiguration", Huawei, HiSilicon, (http://ww.3gpp.org/ftp/tsg_ran/WG1_RL1/TSGR1_69/Docs/R1-122909.zip), 3GPP TSG RAN WG1 Meeting #69, R1-122909, May 25, 2012, 4 Pages.
"Discussion on enhancements for dynamic TDD UL-DL configuration", Renesas Mobile Europe Ltd., (http://ww.3gpp.org/ftp/tsg_ran/WG1_RL1/TSGR1_69/Docs/R1-122363.zip), 3GPP TSG-RAN WG1 Meeting #69, R1-122363, May 25, 2012, 4 Pages.
European Search Report dated Apr. 14, 2016, issued in European Patent Application No. 13852215.6 (with partial English translation).
Alcatel-Lucent Shanghai Bell et al: "Discussion on HARQ timing with dynamic TDD UL-DL configuration", 3GPP Draft; R1-120513 Discussion on HARQ Timing with Dynamic TDD UL-DL Configuration_Final, 3$^{rd}$ Generation Partnership Project (3GPP), Mobile Competence Centre; 650, Route Des Lucioles; F-06921 Sophia-Antipolis Cedex; France, vol. RAN WG1, No. Dresden, Germany; 20120206-20120210, Feb. 1, 2012.
Alcatel-Lucent Shanghai Bell et al; "Discussion on HARQ and UL-grant timing with dynamic TDD UL-DL configuration", 3GPP DRAFT R1-121260, Discussion on HARQ and UL-grant timing with dynamic TDD UL-DL configuration 3$^{rd}$ Generation Partnership Project (3GPP), Mobile Competence Centre; 650, Route Des Lucioles; F-06921 Sophia-Antipolis Cedex; France, vol. RAN WG1, No. Jeju, Korea, Mar. 26-30, 2012, pp. 1-6.
Samsung, "Preliminary evaluation of TDD UL-DL reconfiguration performance", 3GPP Draft R1-112525, Performance of TDD Uplink-Downlink Reconfiguration, 3$^{rd}$ Generation Partnership Project (3GPP), Mobile Competence Centre; 650, Route Des Lucioles; F-06921 Sophia-Antipolis Cedex, France, vol. RAN WG1, Athens, Greece, Aug. 16, 2011, 6 pages.

* cited by examiner

D: Downlink Subframe
U: Uplink Subframe
S: Special Subframe
GP: Guard Period

| Configuration | #0 | #1 | #2 | #3 | #4 | #5 | #6 | #7 | #8 | #9 | UL-DL |
|---|---|---|---|---|---|---|---|---|---|---|---|
| 0 | D | S | U | U | U | D | S | U | U | U | 6:2 |
| 1 | D | S | U | U | D | D | S | U | U | D | 4:4 |
| 2 | D | S | U | D | D | D | S | U | D | D | 2:6 |
| 3 | D | S | U | U | U | D | D | D | D | D | 3:6 |
| 4 | D | S | U | U | D | D | D | D | D | D | 2:7 |
| 5 | D | S | U | D | D | D | D | D | D | D | 1:8 |
| 6 | D | S | U | U | U | D | S | U | U | D | 5:3 |

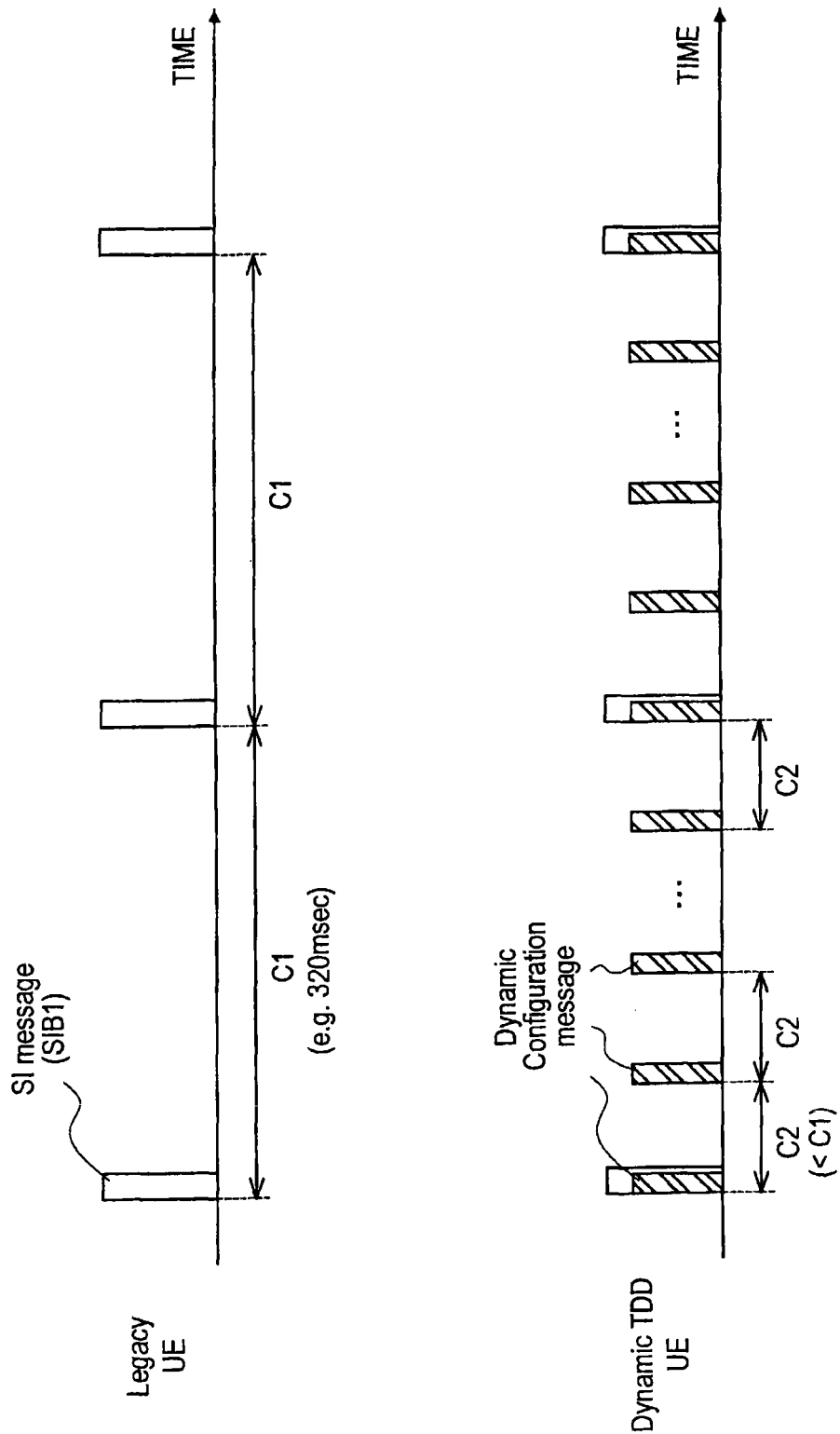

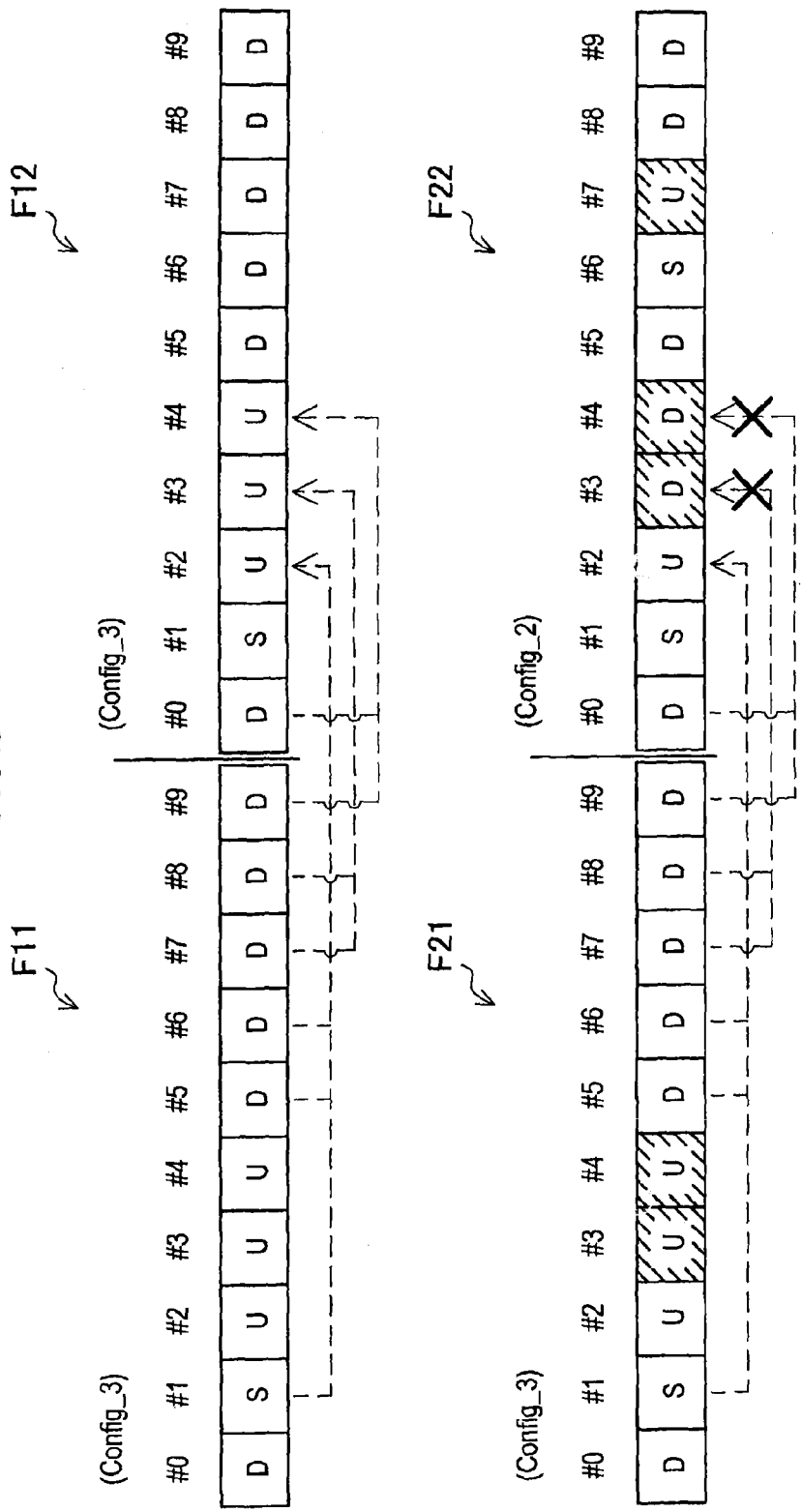

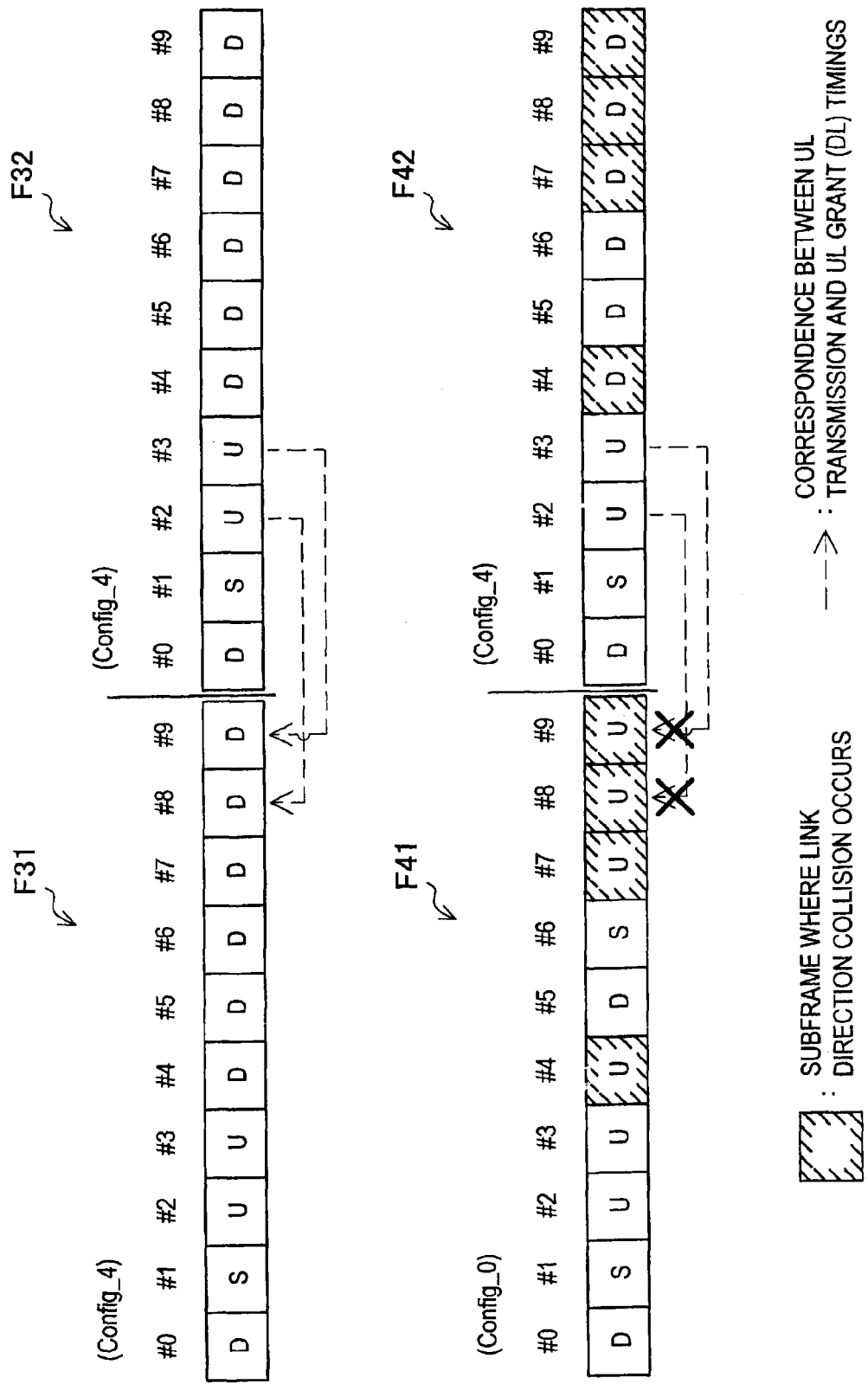

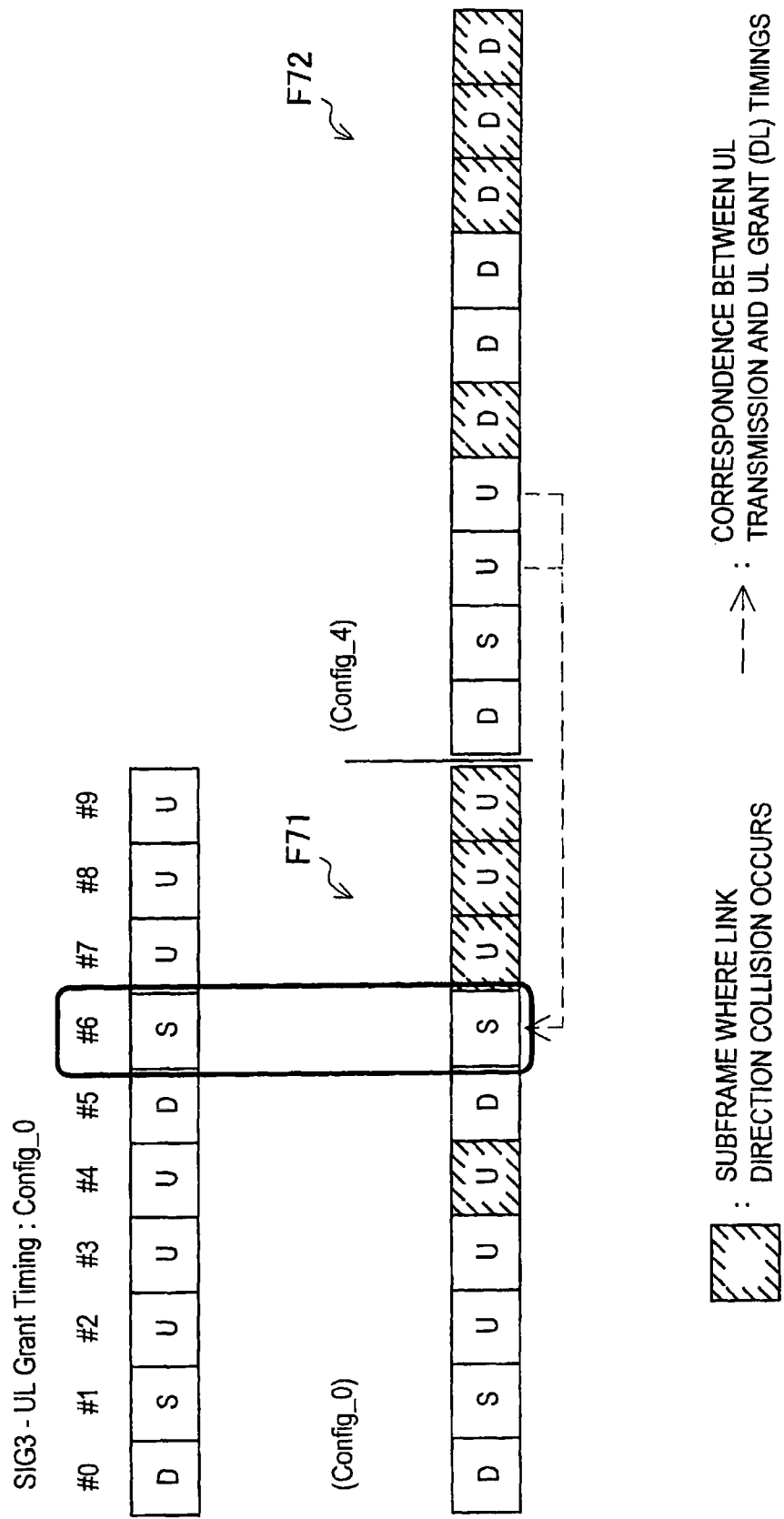

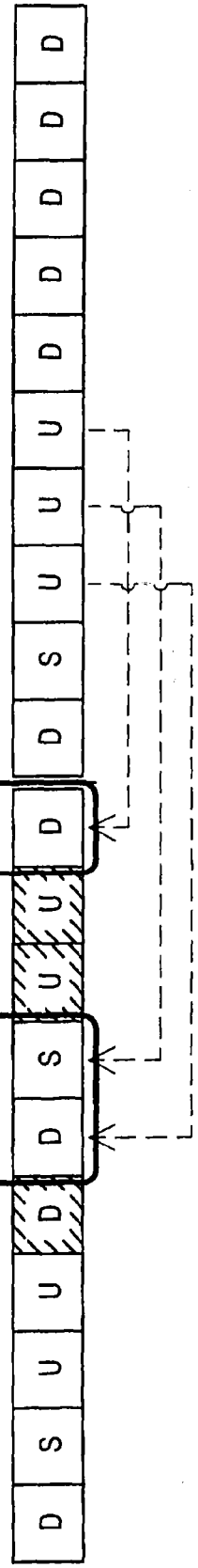

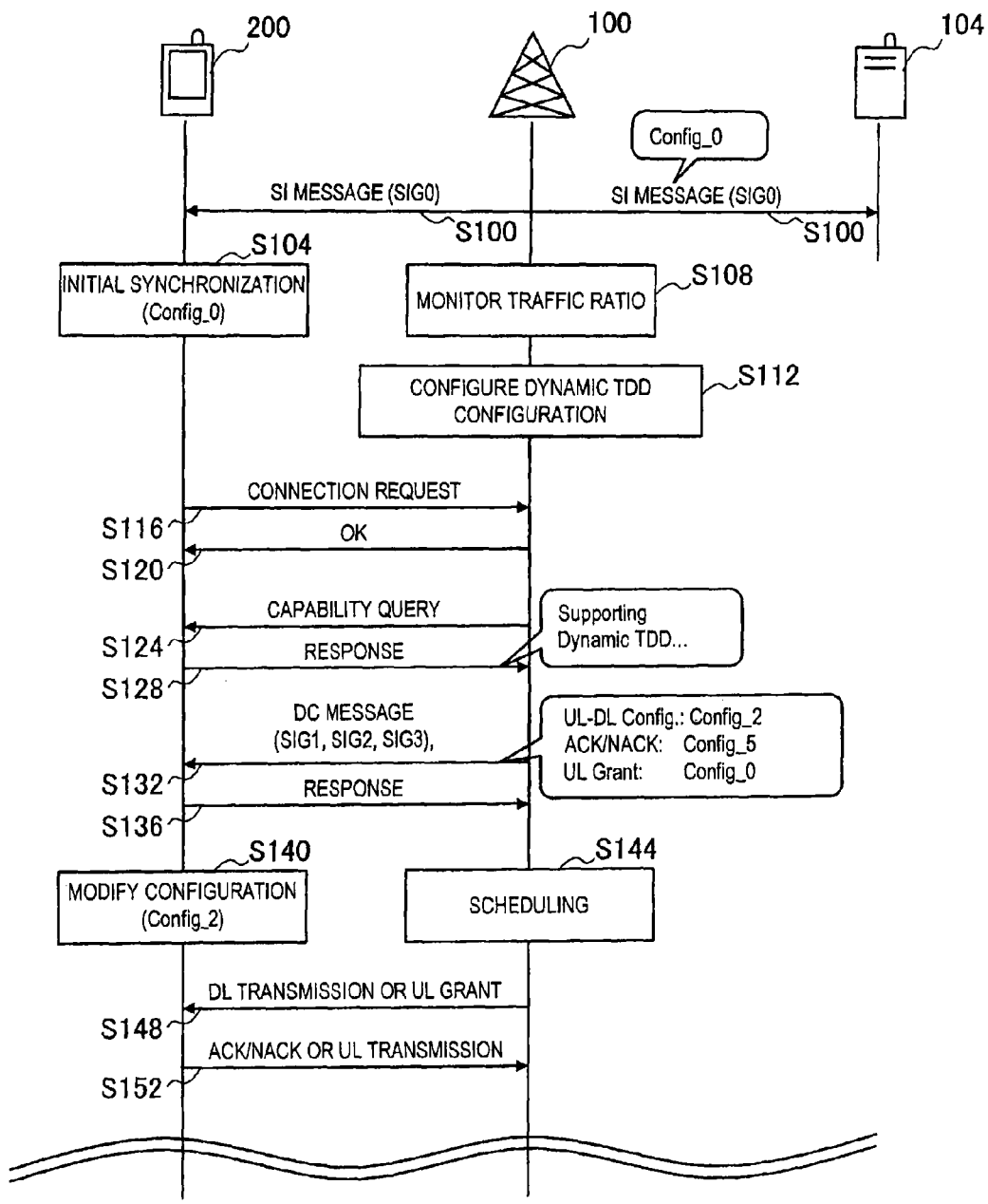

COMMUNICATION CONTROL DEVICE, COMMUNICATION CONTROL METHOD, TERMINAL DEVICE, PROGRAM, AND COMMUNICATION CONTROL SYSTEM

CROSS-REFERENCE TO RELATED APPLICATIONS

This application is a continuation application of and claims the benefit of priority under 35 U.S.C. §120 from U.S. Ser. No. 14/359,809, filed May 21, 2014, which is a National Stage application of PCT/JP13/074371, filed Sep. 10, 2013, and claims benefit of priority under 35 U.S.C. §119 from JP 2012-242598, filed Nov. 2, 2012; the entire contents of each of which are incorporated herein by reference.

TECHNICAL FIELD

The present disclosure relates to a communication control device, a communication control method, a terminal device, a program, and a communication control system.

BACKGROUND ART

Recently, a high-speed cellular radio communication scheme called Long Term Evolution (LTE) is being practically implemented. The LTE scheme is categorized into the FD-LTE scheme and the TD-LTE scheme, on the basis of differences in the duplex scheme. The FD-LTE scheme adopts frequency-division duplex (FDD) as the duplexing scheme, with the uplink and the downlink being operated on mutually different frequency bands. The TD-LTE scheme adopts time-division duplex (TDD) as the duplexing scheme, with the uplink and the downlink being operated on the same frequency band. Both the FD-LTE scheme and the TD-LTE scheme use a frame format in which one radio frame (having a duration of 10 ms) is made up of 10 subframes each having a duration of 1 ms. In the FD-LTE scheme, the link direction does not change over time on the same frequency band, whereas in the TD-LTE scheme, the link direction may change per subframe.

In the TD-LTE scheme, a set of link directions per subframe for each radio frame (that is, a combination of the link directions of 10 subframes) is designated the link direction configuration (or the UL-DL configuration). According to Non-Patent Literature 1, seven types of link direction configurations from Configuration 0 to Configuration 6 are defined. A radio base station (designated eNB in the LTE scheme) signals to a terminal device (designated UE in the LTE scheme) by broadcasting the link direction configuration configured for each radio frame in a system information block type 1 (SIB1). In the current standard specification, the update cycle of the link direction configuration conducted using the SIB1 is 640 ms. Non-Patent Literature 2 proposes shortening this cycle to 320 ms.

In the case of updating the link direction configuration on a short cycle, a problem arises in that link direction collisions frequently occur between the two link direction configurations pre-update and post-update, as described in Non-Patent Literature 3. Link direction collisions cause loss in data transmission and control signaling at the timings when a collision occurs, lowering communication throughput. Non-Patent Literature 3 describes two cases in which link direction collisions may invite lowered throughput: the case of an acknowledgement (ACK) and a negative acknowledgement (NACK) of a downlink transmission, and the case of an uplink grant (UL grant) preceding an uplink transmission. As a solution to this problem, Non-Patent Literature 3 proposes a technique that dynamically modifies the ACK/NACK or uplink grant timing in the case of determining that a link direction collision has occurred.

CITATION LIST

Non-Patent Literature

Non-Patent Literature 1: 3GPP TS 36.211 V10.0.0 (2010-12)", Dec. 22, 2010

Non-Patent Literature 2: "Semi-static reconfiguration of TDD UL-DL configuration", R1-122266, 3GPP TSG RAN WG1 Meeting #69, Prague, Czech Republic, May 21-25, 2012

Non-Patent Literature 3: "Discussion on HARQ and UL-grant timing with dynamic TDD UL-DL configuration", R1-121260, 3GPP TSG RAN WG1 Meeting #68bis, Jeju, Korea, Mar. 26-30, 2012

SUMMARY OF INVENTION

Technical Problem

However, according to the technique proposed by Non-Patent Literature 3, a link direction collision determination and a control signaling timing modification will be executed every time the link direction configuration is updated. If one presupposes that the link direction configuration is updated on a short cycle, such a solution significantly would increase the processing load on the terminal device and the base station.

Consequently, it is desirable to provide an improved mechanism capable of preventing lowered throughput caused by link direction collisions with a lower processing load under conditions in which the link direction configuration is updated on a short cycle.

Solution to Problem

According to the present disclosure, there is provided a communication control device that controls radio communication conducted by a terminal device according to a time-division duplex (TDD) scheme on a radio communication network, the communication control device including a configuration section that configures, for each frame that includes a plurality of subframes, a link direction configuration expressing a link direction per subframe for the radio communication. The configuration section configures a timing of control signaling in a second link direction which is associated with data transmission in a first link direction in the radio communication, and which is opposite to the first link direction, independently of the configured link direction configuration.

According to the present disclosure, there is provided a communication control method for controlling radio communication conducted by a terminal device according to a time-division duplex (TDD) scheme on a radio communication network, the communication control method including configuring, for each frame that includes a plurality of subframes, a link direction configuration expressing a link direction per subframe for the radio communication, and configuring a timing of control signaling in a second link direction which is associated with data transmission in a first link direction in the radio communication, and which is opposite to the first link direction, independently of the configured link direction configuration.

According to the present disclosure, there is provided a program causing a computer of a communication control device that controls radio communication conducted by a terminal device according to a time-division duplex (TDD) scheme on a radio communication network to function as a configuration section that configures, for each frame that includes a plurality of subframes, a link direction configuration expressing a link direction per subframe for the radio communication. The configuration section configures a timing of control signaling in a second link direction which is associated with data transmission in a first link direction in the radio communication, and which is opposite to the first link direction, independently of the configured link direction configuration.

According to the present disclosure, there is provided a terminal device including a radio communication section that communicates with a base station according to a time-division duplex (TDD) scheme, and a control section that, according to a link direction configuration indicated by first signaling from the base station, configures a link direction per subframe for each frame that includes a plurality of subframes. The control section configures, on the basis of second signaling from the base station, an offset between a timing of a data transmission in a first link direction and a timing of control signaling in a second link direction which is associated with the data transmission, and which is opposite to the first link direction.

According to the present disclosure, there is provided a radio communication method executed by a terminal device provided with a radio communication section that communicates with a base station according to a time-division duplex (TDD) scheme, the radio communication method including configuring, according to a link direction configuration indicated by first signaling from the base station, a link direction per subframe for each frame that includes a plurality of subframes, and configuring, on the basis of second signaling from the base station, an offset between a timing of a data transmission in a first link direction and a timing of control signaling in a second link direction which is associated with the data transmission, and which is opposite to the first link direction.

According to the present disclosure, there is provided a program causing a computer of a terminal device provided with a radio communication section that communicates with a base station according to a time-division duplex (TDD) scheme to function as a control section that, according to a link direction configuration indicated by first signaling from the base station, configures a link direction per subframe for each frame that includes a plurality of subframes. The control section configures, on the basis of second signaling from the base station, an offset between a timing of a data transmission in a first link direction and a timing of control signaling in a second link direction which is associated with the data transmission, and which is opposite to the first link direction.

According to the present disclosure, there is provided a communication control system including a terminal device that communicates with a base station according to a time-division duplex (TDD) scheme, and a communication control device that controls radio communication conducted by the terminal device, the communication control device including a configuration section that configures, for each frame that includes a plurality of subframes, a link direction configuration expressing a link direction per subframe for the radio communication. The configuration section configures a timing of control signaling in a second link direction which is associated with data transmission in a first link direction in the radio communication, and which is opposite to the first link direction, independently of the configured link direction configuration.

Advantageous Effects of Invention

According to technology in accordance with the present disclosure, it is possible to prevent lowered throughput caused by link direction collisions with a lower processing load under conditions in which the link direction configuration is updated on a short cycle.

BRIEF DESCRIPTION OF DRAWINGS

FIG. 4 is an explanatory diagram for describing signaling of a link direction configuration using a new message.

FIG. 5 is an explanatory diagram for describing a first case in which throughput may be lowered due to a link direction collision.

FIG. 6 is an explanatory diagram for describing a second case in which throughput may be lowered due to a link direction collision.

FIG. 11A is an explanatory diagram for describing a first example of a new UL grant transmission timing.

FIG. 11B is an explanatory diagram for describing a second example of a new UL grant transmission timing.

FIG. 14A is the first half of a sequence diagram illustrating an example of the flow of a process that may be executed in an embodiment.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Also, the description will proceed in the following order.
1. Overview
1-1. Configuring link direction configuration
1-2. Signaling link direction configuration
1-3. Link direction collision
1-4. Additional issues
2. Configuration of communication control system
2-1. Overview of system
2-2. Basic principles
2-3. Exemplary configuration of communication control device
2-4. Exemplary configuration of dynamic TDD terminal
3. Example of process flow
4. Conclusion

1. OVERVIEW

[1-1. Configuring Link Direction Configuration]

Figures 1, 2:
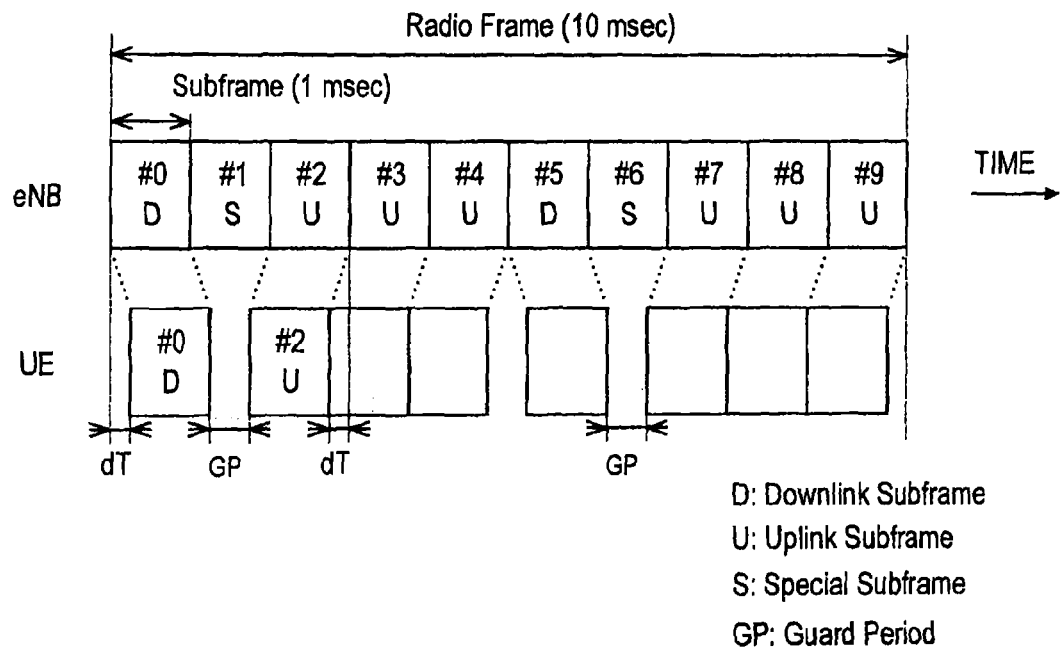
FIG. 1 is an explanatory diagram for describing an example of a link direction configuration in TD-LTE.
FIG. 2 is an explanatory diagram illustrating a list of configurable link direction configurations in TD-LTE.

FIG. 1 is an explanatory diagram for describing an example of a link direction configuration in TD-LTE. Referring to FIG. 1, a frame format of a radio frame adopted in the LTE scheme is illustrated. One radio frame includes 10 subframes (#0 to #9). The duration of each subframe is 1 ms, and the duration of one radio frame is 10 ms. The link direction is configured per subframe. In the example of FIG. 1, the link direction of subframes labeled "D" is downlink, and such subframes are designated downlink subframes. The link direction of subframes labeled "U" is uplink, and such subframes are designated uplink subframes. The subframes labeled "S" are special subframes unique to TD-LTE. As exemplified in FIG. 1, a downlink signal transmitted from a base station (eNB) arrives at a terminal device (UE) with a delay dT. The terminal device takes the delay dT of an uplink signal arriving at the base station into consideration, and transmits an uplink signal prior to the timing of an uplink subframe of the base station. A special subframe is inserted at the timing of switching from a downlink subframe to an uplink subframe, and acts as a buffer period so that the timings of receiving a downlink signal and transmitting an uplink signal at a terminal device do not overlap. A special subframe includes a downlink pilot time slot in which a downlink signal is received by the UE, a guard period, and an uplink pilot time slot in which an uplink signal is transmitted by the UE. Note that downlink data may also be transmitted from the base station to the terminal device in the special subframe. In this sense, the special subframe may be viewed as being a type of downlink subframe.

FIG. 2 illustrates a list of seven types of configurable link direction configurations in TD-LTE, which are defined in Non-Patent Literature 1. As FIG. 2 demonstrates, the 0th subframe (#0) and the 5th subframe (#5) are configured as downlink subframes in all configurations. The 1st subframe (#1) is configured as a special subframe in all configurations. The 2nd subframe (#2) is configured as an uplink subframe in all configurations. Configuration of the remaining subframes differs for each configuration.

On the right edge of FIG. 2, the ratio of the number of uplink subframes versus the number of downlink subframes (UL-DL ratio) is indicated. In Configuration 0, there are six uplink subframes and two downlink subframes, for a UL-DL ratio of 6:2. In Configuration 1, there are four uplink subframes and four downlink subframes, for a UL-DL ratio of 4:4. In Configuration 2, there are two uplink subframes and six downlink subframes, for a UL-DL ratio of 2:6. In Configuration 3, there are three uplink subframes and six downlink subframes, for a UL-DL ratio of 3:6. In Configuration 4, there are two uplink subframes and seven downlink subframes, for a UL-DL ratio of 2:7. In Configuration 5, there is one uplink subframe and eight downlink subframes, for a UL-DL ratio of 1:8. In Configuration 6, there are five uplink subframes and three downlink subframes, for a UL-DL ratio of 5:3.

Figure 3A:
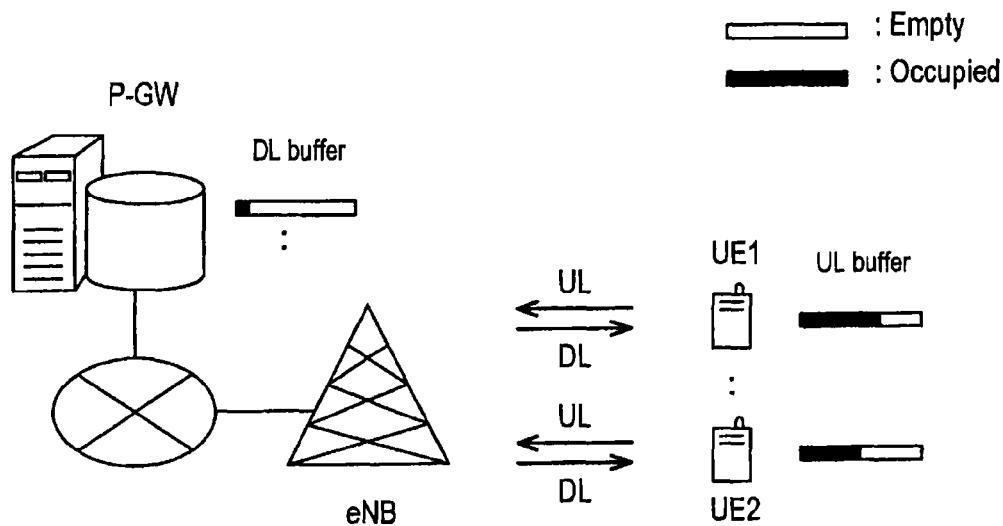
FIG. 3A is a first explanatory diagram for describing the configuration of a link direction configuration according to buffer status.
Figure 3B:
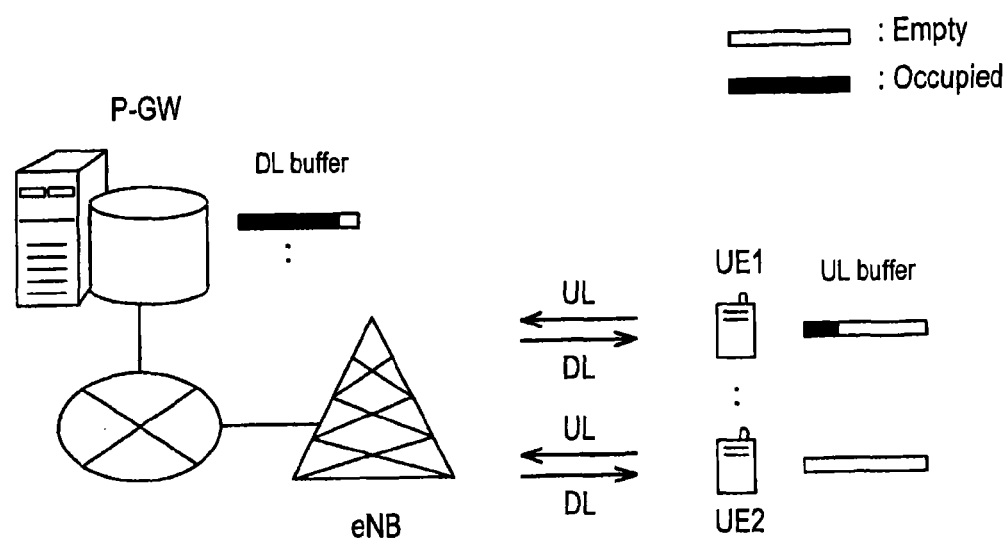
FIG. 3B is a second explanatory diagram for describing the configuration of a link direction configuration according to buffer status.

A radio communication system that operates according to the TD-LTE scheme may decide which of the seven types of link direction configurations to use on the basis of the UL-DL traffic ratio. Generally, an uplink signal is buffered by the terminal device's uplink buffer before transmission is granted. Meanwhile, a downlink signal is buffered by the PDN Gateway (P-GW) on the core network before transmission is scheduled. If the amount of buffered traffic exceeds the buffer capacity, a buffer overflow occurs. In addition, traffic that has been buffered past a designated period may be discarded as a timeout. Accordingly, the terminal device periodically transmits to the base station a buffer status report indicating the amount of uplink traffic being buffered. The P-GW provides buffer signaling that indicates the amount of downlink traffic being buffered. Consequently, a scheduler inside the base station or another control node is able to compute the UL-DL traffic ratio for each cell. For example, in the example of FIG. 3A, there is more buffered uplink traffic than buffered downlink traffic. In this case, by configuring a link direction configuration with a high uplink ratio, the buffered uplink traffic may be decreased. On the other hand, in the example of FIG. 3B, there is more buffered downlink traffic than buffered uplink traffic. In this case, by configuring a link direction configuration with a high downlink ratio, the buffered downlink traffic may be decreased.

[1-2. Signaling Link Direction Configuration]

A link direction configuration that has been configured by the base station or another control node is signaled with a broadcast using the SIB1 from the base station to the terminal device. The update cycle of the SIB1 in the current standard specification is 640 ms. According to the above Non-Patent Literature 2, the update cycle of the link direction configuration using the SIB1 may be shortened to 320 ms. The SIB1 is one of various types of system information blocks (SIBs) mapped to the downlink shared channel (DL-SCH). A message transporting an SIB is designated a system information (SI) message. The shortest transmission cycle of an SI message is 80 ms. Consequently, as long as the link direction configuration is signaled with an SI message, the shortest update cycle of the link direction configuration is 80 ms.

Recently, radio communication traffic has been dramatically increasing. The UL-DL traffic ratio varies frequently. Consequently, the signaling cycle of the link direction configuration in existing techniques is less than sufficient to track the variations in the UL-DL traffic ratio. If the link direction configuration updates do not keep up with the variations in the UL-DL traffic ratio, the amount of buffered traffic will increase, leading to decreased resource utilization and lowered throughput. Without taking signaling overhead into account, since the duration of one radio frame is 10 ms, the ideal update cycle of the link direction configuration is 10 ms. However, if the mechanism for signaling the link direction configuration is completely changed from existing techniques, existing terminal devices will be unable to acquire the link direction configuration and become inoperative.

Accordingly, in an embodiment, there is introduced a new message different from a SI message for signaling the link direction configuration to a terminal device on a shorter cycle than existing techniques. In this specification, this new message to be introduced is designated the dynamic configuration (DC) message. In addition, a terminal device that receives only an SI message in order to configure the link direction configuration is designated a legacy terminal (legacy UE). In contrast, a terminal device that receives a DC message is designated a dynamic TDD terminal (dynamic TDD UE).

FIG. 4 is an explanatory diagram for describing signaling of a link direction configuration using a DC message.

The top part of FIG. 4 illustrates how a legacy terminal periodically receives an SI message transporting the SIB1 on a cycle C1. The SIB1 includes a link direction configuration identity (one of the configuration numbers 0 to 6 exemplified in FIG. 2) configured for the legacy terminal at that time. Following this link direction configuration, the legacy terminal configures the link direction of its own radio communication circuit per subframe. The SI message signaling cycle C1 is 320 ms, for example. At this point, suppose that the UL-DL traffic ratio varies greatly at a time 20 ms after receiving the SI message. In this case, a mismatch between the configured link direction configuration and the UL-DL traffic ratio would continue over a period of 300 ms until the next SI message is received.

The bottom part of FIG. 4 illustrates how a dynamic TDD terminal periodically receives a DC message on a cycle C2 (where C2<C1). The DC message includes a link direction configuration identity (one of the configuration numbers 0 to 6 exemplified in FIG. 2) configured for the dynamic TDD terminal at that time. Following this link direction configuration, the dynamic TDD terminal configures the link direction of its own radio communication circuit per subframe. The DC message signaling cycle C2 may be an integer multiple of 10 ms. For example, if the signaling cycle C2=40 ms, the period of a continued mismatch between the link direction configuration and the UL-DL traffic ratio would be at worst 40 ms.

In an embodiment, the base station signals to a legacy terminal a first link direction configuration using an SI message, and signals to a dynamic TDD terminal a second link direction configuration using a DC message. In this specification, the first link direction configuration that may be updated on the cycle C1 is designated the legacy configuration. Also, the second link direction configuration is designated the dynamic TDD configuration. The base station signals these two configurations, but in actual practice operates according to the dynamic TDD configuration as described later. Note that when a designated event occurs, such as a dynamic TDD terminal establishing a new connection or returning to active mode, the base station may also transmit a DC message without waiting for the signaling cycle to elapse.

In another embodiment, the signaling to a legacy terminal using an SI message may also be omitted. Technology according to the present disclosure is also applicable to a system which contains no legacy terminals for which backward compatibility should be guaranteed, and which signals only a dynamic TDD configuration that may be updated on a short cycle.

[1-3. Link Direction Collision]

In the case of updating the dynamic TDD configuration on a short cycle, link direction collisions may occur frequently between the two configurations pre-update and post-update. Herein, a link direction collision refers to a mutual difference between the link direction of the ith subframe (where i=0, ..., 9) of a radio frame before an update and the link direction of the ith subframe of a radio frame after an update. Link direction collisions cause loss in data transmission and control signaling at the timings when a collision occurs, lowering communication throughput. Hereinafter, the two cases described in Non-Patent Literature 3 will be described.

(1) ACK/NACK in Response to Downlink Transmission

The acknowledgement (ACK) and negative acknowledgement (NACK) are the basic control signaling that form the base of the hybrid automatic repeat request (HARQ), a mechanism for ensuring the reliability of data transmission. The offset between the timing of a downlink transmission and the timing of an ACK/NACK is defined for each link direction configuration in Table 10.1.3.1-1 of 3GPP TS 36.213 (see Table 1).

TABLE 1

Offset between downlink transmission and ACK/NACK
(See 3GPP TS 36.213 Table 10.1.3.1-1)

| UL-DL Config- uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Table 1 illustrates timing offsets between a downlink transmission and an ACK/NACK associated with that downlink transmission, in units of numbers of subframes. The transmission timing of an ACK/NACK will be described while also referencing FIG. 5. The top part of FIG. 5 illustrates two consecutive radio frames F11 and F12 configured with Configuration 3. In the radio frames F11 and F12, downlink transmission may occur in the 0th, 1st, 5th, 6th, 7th, 8th, and 9th subframes. Referring to the Configuration 3 row in Table 1, an ACK/NACK in response to a downlink transmission in the 0th subframe may be transmitted in the 4th subframe indicating an offset of 4. An ACK/NACK in response to a downlink transmission in the 1st subframe may be transmitted in the 2nd subframe (of the next radio frame) indicating an offset of 11. An ACK/NACK in response to a downlink transmission in the 5th subframe may be transmitted in the 2nd subframe (of the next radio frame) indicating an offset of 7. An ACK/NACK in response to a downlink transmission in the 6th subframe may be transmitted in the 2nd subframe (of the next radio frame) indicating an offset of 6. An ACK/NACK in response to a downlink transmission in the 7th subframe may be transmitted in the 3rd subframe (of the next radio frame) indicating an offset of 6. An ACK/NACK in response to a downlink transmission in the 8th subframe may be transmitted in the 3rd subframe (of the next radio frame) indicating an offset of 5. An ACK/NACK in response to a downlink transmission in the 9th subframe may be transmitted in the 4th subframe (of the next radio frame) indicating an offset of 5. The correspondence relationships of such timings are indicated by the dashed arrows in FIG. 5. A device participating in radio communication stores a standardized table like Table 1 in advance, and may decide on a transmission timing of an ACK/NACK in response to a downlink transmission by referencing that table.

However, in the case in which the link direction configuration is updated, there exist subframes with different link directions between the pre-update radio frame and the post-update radio frame. In the bottom part of FIG. 5, Configuration 2 is configured for a radio frame F22 that follows a radio frame F21 configured with Configuration 3. In this case, link direction collisions occur at the 3rd and 4th subframes. As a result, an ACK/NACK in response to a downlink transmission in the 7th, 8th, and 9th subframes of the radio frame F21 as well as the 0th subframe of the radio frame F22 cannot be transmitted by the terminal device in the 3rd and 4th subframes of the radio frame F22 as specified by the above table. If the ACK/NACK is lost, even if the corresponding downlink transmission was conducted normally, the base station is unable to recognize this fact, and may resend already-transmitted data. Consequently, radio resources may be wasted, and system throughput may be lowered.

(2) UL Grant Preceding Uplink Transmission

An uplink grant (UL grant) is control signaling for informing the terminal device that uplink transmission has been scheduled. The timing offset between an uplink transmission and an uplink grant is defined for each link direction configuration in Table 8-2 of 3GPP TS 36.213 (see Table 2).

TABLE 2

Offset between UL grant and uplink transmission
(See 3GPP TS 36.213 Table 8-2)

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6, 7 | | | | 4 | 6, 7 | | | |
| 1 | | 6 | | | 4 | | 6 | | | 4 |
| 2 | | | | 4 | | | | | 4 | |
| 3 | 4 | | | | | | | 4 | 4 | 4 |
| 4 | | | | | | | | | 4 | 4 |
| 5 | | | | | | | | | 4 | |
| 6 | 7 | 7 | | | | 7 | 7 | | | 5 |

Table 2 illustrates timing offsets between an uplink transmission and a UL grant associated with that uplink transmission, in units of numbers of subframes. Note that whereas Table 1 illustrates offsets going backwards (in the past) with reference to the transmission timing of an ACK/NACK, Table 2 illustrates offsets going forwards (in the future) with reference to the transmission timing of a UL grant. The transmission timing of a UL grant will be described while also referencing FIG. 6. The top part of FIG. 6 illustrates two consecutive radio frames F31 and F32 configured with Configuration 4. In the radio frames F31 and F32, uplink transmission may occur in the 2nd and 3rd subframes. Referring to the Configuration 4 row in Table 2, a UL grant for an uplink transmission in the 2nd subframe may be transmitted in the 8th subframe (of the previous radio frame) indicating an offset of 4. A UL grant for an uplink transmission in the 3rd subframe may be transmitted in the 9nd subframe (of the previous radio frame) indicating an offset of 4. The correspondence relationships of such timings are indicated by the dashed arrows in FIG. 6. A device participating in radio communication stores a standardized table like Table 2 in advance, and may decide on a transmission timing of a UL grant for an uplink transmission by referencing that table.

However, in the case in which the link direction configuration is updated, there exist subframes with different link directions between the pre-update radio frame and the post-update radio frame. In the bottom part of FIG. 6, Configuration 4 is configured for a radio frame F42 that follows a radio frame F41 configured with Configuration 0. In this case, link direction collisions occur at the 4th, 7th, 8th, and 9th subframes. As a result, a UL grant for an uplink transmission in the 2nd and 3rd subframes of the radio frame F42 cannot be transmitted by the base station in the 8th and 9th subframes of the radio frame F41 as specified by the above table. The terminal device will not execute uplink transmission unless a UL grant is transmitted. In this case, since the 2nd and 3rd subframes of the radio frame F42 become unused, the radio resource utilization falls, and system throughput may be lowered.

(3) Problems of Existing Techniques

Non-Patent Literature 3 proposes several solutions to the issues discussed above under conditions in which the link direction configuration is updated on a short cycle. These solutions involve delaying or moving up the timings of control signaling (ACK/NACK or UL grant) or the like, and all require a link direction collision judgment and individual modification of the timings of control signaling. If one presupposes that the link direction configuration is updated on a short cycle, such solutions, in addition to significantly increasing the processing load and worsening power consumption, also have the demerit of inviting cost increases due to complicated implementation. Technology in accordance with the present disclosure proposes an improved mechanism that, while avoiding these demerits, makes it possible to prevent lowered throughput caused by link direction collisions with a lower processing load under conditions in which the link direction configuration is updated on a short cycle.

[1-4. Additional Issues]

Note that as a result of the dynamic TDD configuration being updated on a shorter cycle than the legacy configuration, link direction collisions may also occur between these two configurations. There is also a possibility that link direction collisions between the two configurations may affect the synchronization operation of legacy terminals.

Figure 7A:
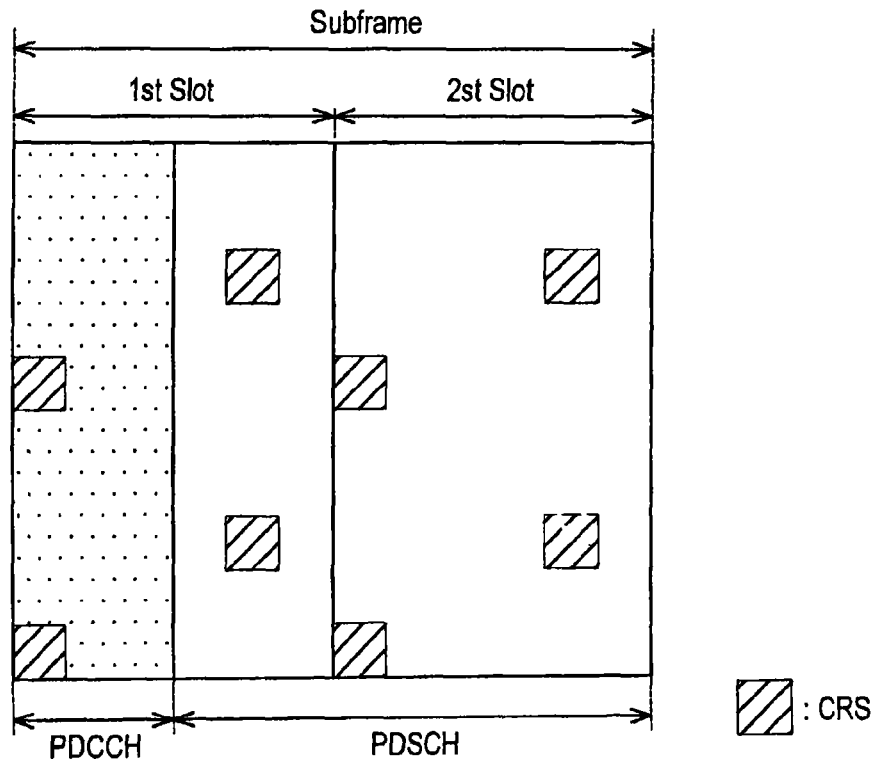
FIG. 7A is an explanatory diagram illustrating a first example of a subframe that includes a cell-specific reference symbol (CRS).
Figure 7B:
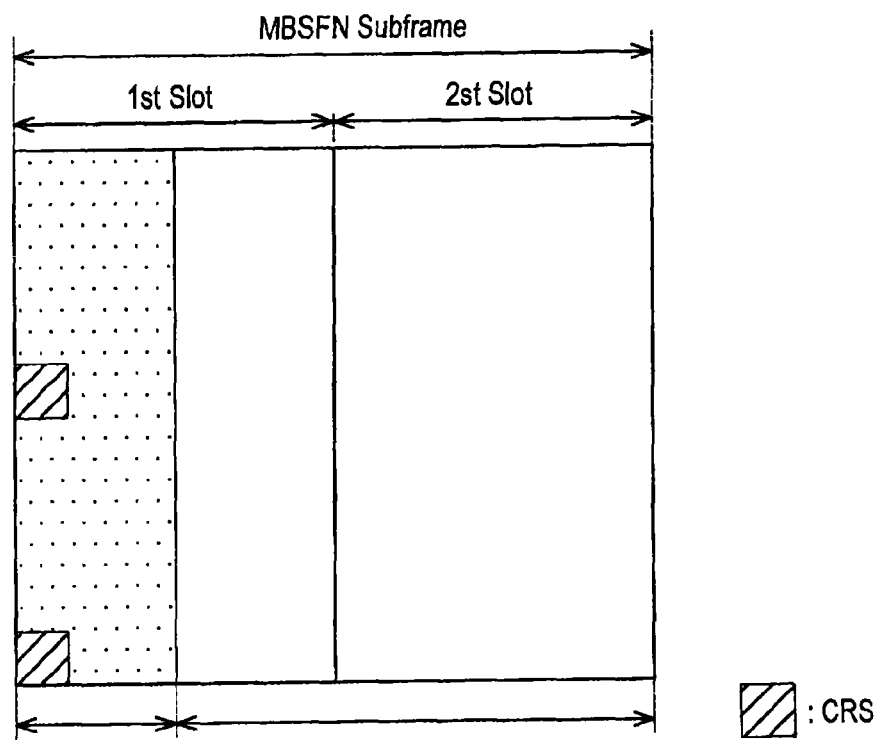
FIG. 7B is an explanatory diagram illustrating a second example of a subframe that includes a CRS.

Generally the synchronization operation of a terminal device includes basic synchronization and synchronization tracking. Basic synchronization refers to synchronization from a state in which the operating timings of the terminal device are completely unsynchronized with the operating timings of the base station. Basic synchronization is conducted by having the terminal device search for a primary synchronization signal (PSS) and a secondary synchronization signal (SSS). Via basic synchronization, the terminal device acquires the cell ID of the connecting cell, and ascertains the rough timings of radio frames. Synchronization tracking is executed after the completion of basic synchronization in order to improve the synchronization precision. Synchronization tracking is conducted by having the terminal device receive a cell-specific reference symbol (CRS). As exemplified in FIG. 7A, as a general rule the CRS is dispersively inserted into the physical downlink control channel (PDCCH) and the physical downlink shared channel (PDSCH) of each downlink subframe. The terminal device maintains the synchronization of operating timings by receiving the CRS in these downlink subframes in both idle mode (RRC_Idle) and active mode (RRC_Connected), irrespective of whether or not data addressed to the device itself exists. Note that if a downlink subframe is configured as an MBMS single frequency network (MBSFN) subframe, the PDSCH of that downlink subframe is used only for the purpose of broadcasting or multicasting a Multimedia Broadcast Multicast Services (MBMS) signal. As exemplified in FIG. 7B, the CRS is not inserted into the PDSCH of an MBSFN subframe.

At this point, assume that Configuration 2 is configured as the legacy configuration, and Configuration 4 is configured as the dynamic TDD configuration, for example (see FIG. 2). Since the base station operates in accordance with the dynamic TDD configuration, the link direction of the 3rd subframe (#3) is uplink, and the link direction of the 7th subframe (#7) is downlink. However, a legacy terminal, following the legacy configuration, recognizes that the link direction of the 3rd subframe is downlink, and the link direction of the 7th subframe is uplink. Subsequently, the legacy terminal attempts to receive the CRS for synchronization tracking in the 3rd subframe. However, the base station does not transmit the CRS in that subframe, which is actually an uplink subframe. As a result, there occurs a risk of lowered synchronization tracking precision in the legacy terminal. Note that in the 7th subframe, although the base station transmits the CRS, the legacy terminal does not receive that CRS. However, the synchronization tracking precision of the legacy terminal does not drop even if some of the CRS symbols are not received, and thus the effects of link direction collision in the 7th subframe are small.

According to the embodiment described in the next section, the effects of link direction collision between the two configurations may be avoided or mitigated.

2. CONFIGURATION OF COMMUNICATION CONTROL SYSTEM

[2-1. Overview of System]

Figure 8:
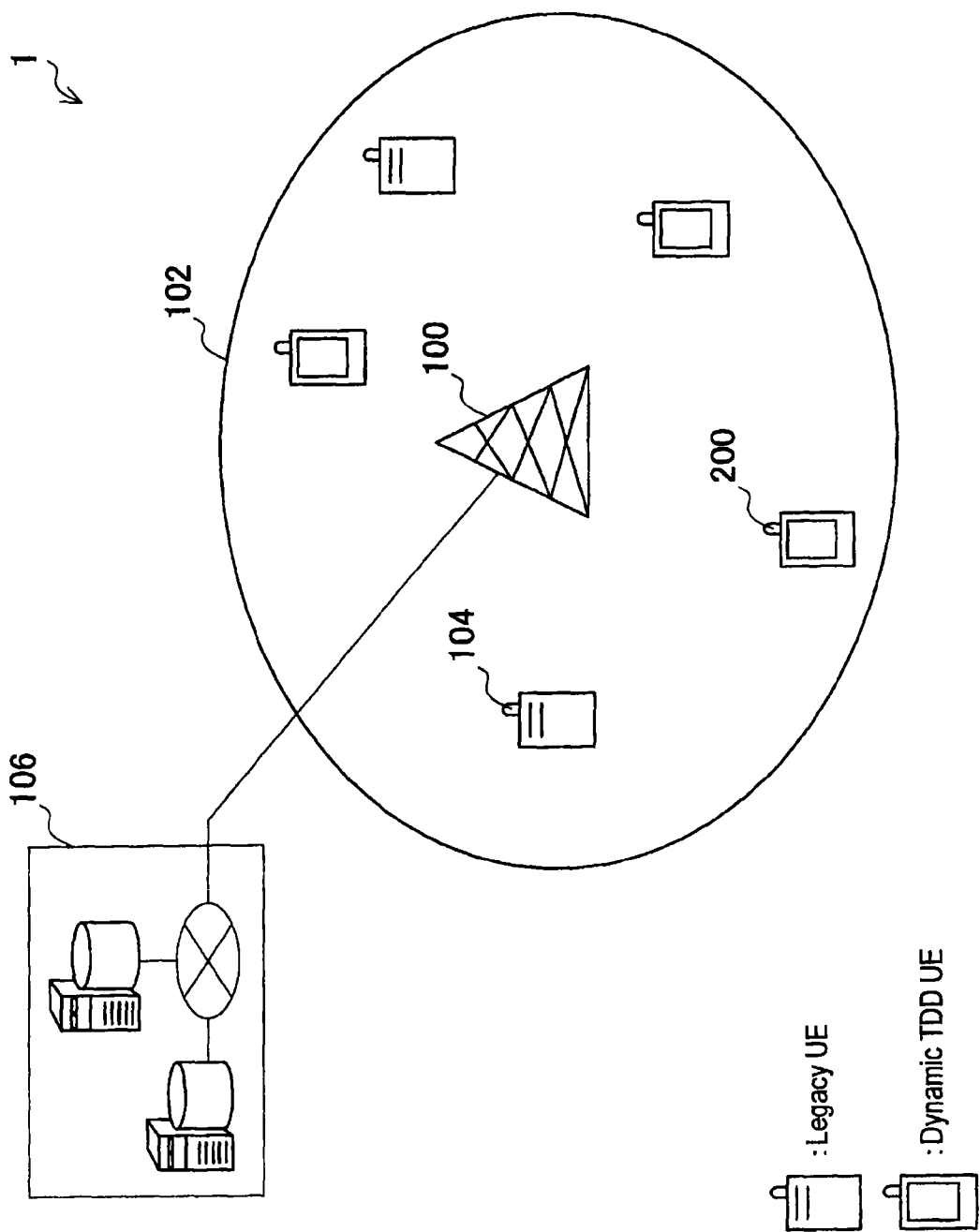
FIG. 8 is an explanatory diagram illustrating an example of a configuration of a communication control system according to an embodiment.

FIG. 8 is an explanatory diagram illustrating an example of a configuration of a communication control system 1 according to an embodiment of technology in accordance with the present disclosure. Referring to FIG. 8, the communication control system 1 includes a base station 100. The base station (eNB) 100 provides radio communication service in accordance with the TD-LTE scheme to a legacy terminal 104 and a dynamic TDD terminal 200 positioned inside a cell 102. The base station 100 is connected to a core network 106, typically realized as the Evolved Packet Core (EPC). The core network 106 includes various control nodes, such as the Mobility Management Entity (MME), the Serving Gateway (S-GW), and the P-GW, for example.

The legacy terminal 104 is a terminal device that operates according to a legacy configuration. The dynamic TDD terminal 200 is a terminal device capable of operating according to a dynamic TDD configuration. The dynamic TDD terminal 200 may also be capable of additionally operating according to a legacy configuration. The control function that configures these link direction configurations and conducts control signaling for the terminal devices may be placed in the base station 100, or any control node that communicates with these terminal devices via the base station 100. As an example, the following description assumes that the base station 100 includes this control function.

[2-2. Basic Principles]

This section describes the basic principles for preventing lowered throughput caused by link direction collisions while still enabling the dynamic TDD configuration to be updated on a short cycle in the communication control system 1.

(1) Introduction of New Signaling

In the present embodiment, the base station 100 configures a legacy configuration for the legacy terminal 104. In addition, the base station 100 configures a dynamic TDD configuration for the dynamic TDD terminal 200. The dynamic TDD configuration is updatable on a shorter time interval than the signaling cycle of the legacy configuration. Furthermore, the base station 100 configures the timings of control signaling in a second link direction (UL or DL) that is associated with data transmission in a first link direction (DL or UL), independently of the dynamic TDD configuration. The control signaling referred to herein may include one or both of an ACK/NACK associated with a downlink transmission, and a UL grant associated with an uplink transmission. The base station 100 then executes several types of signaling on the basis of these configurations.

Figure 9A:
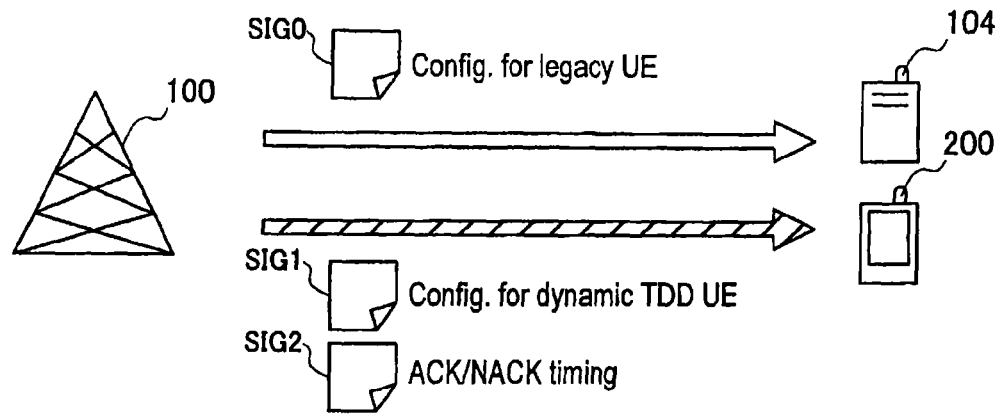
FIG. 9A is an explanatory diagram for describing a first example of new signaling.

FIG. 9A is an explanatory diagram for describing a first example of new signaling that may be introduced in the present embodiment. Referring to FIG. 9A, the base station 100 executes a signaling SIG0 directed towards the legacy terminal 104, as well as a signaling SIG1 and a signaling SIG2 directed towards the dynamic TDD terminal 200. For example, the signaling SIG0 is an SI message informing the legacy terminal 104 of the legacy configuration. The signaling SIG1 is a dynamic configuration (DC) message informing the dynamic TDD terminal 200 of the dynamic TDD configuration. The signaling SIG2 is a new message informing the dynamic TDD terminal 200 of the transmission timing of an ACK/NACK associated with a downlink transmission. The dynamic TDD terminal 200, on the basis of the received signaling SIG2, recognizes the offset between the downlink subframe in which the downlink transmission is conducted and the uplink subframe in which to transmit the ACK/NACK.

Figure 9B:
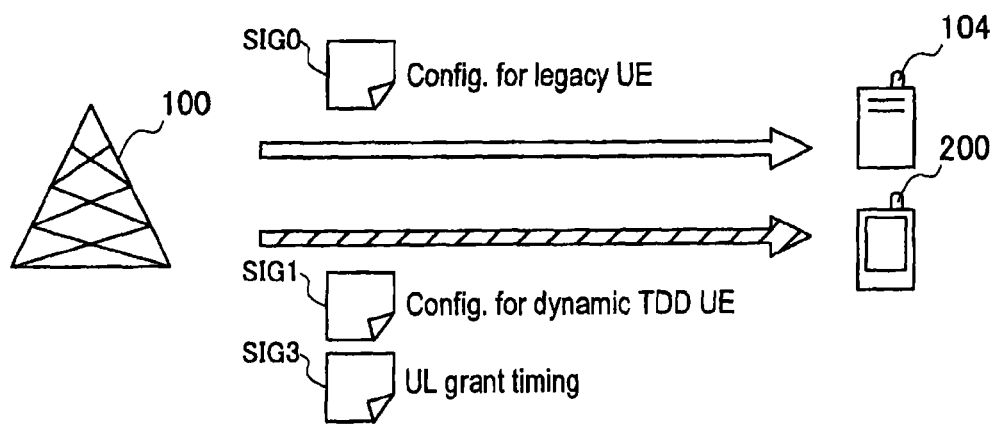
FIG. 9B is an explanatory diagram for describing a second example of new signaling.

FIG. 9B is an explanatory diagram for describing a second example of new signaling that may be introduced in the present embodiment. Referring to FIG. 9B, the base station 100 executes a signaling SIG0 directed towards the legacy terminal 104, as well as a signaling SIG1 and a signaling SIG3 directed towards the dynamic TDD terminal 200. For example, the signaling SIG3 is a new message informing the dynamic TDD terminal 200 of the transmission timing of an uplink transmission associated with a UL grant. The dynamic TDD terminal 200, on the basis of the signaling SIG3, recognizes the offset between the downlink subframe in which the UL grant is received and the uplink subframe in which uplink transmission is granted.

Figure 9C:
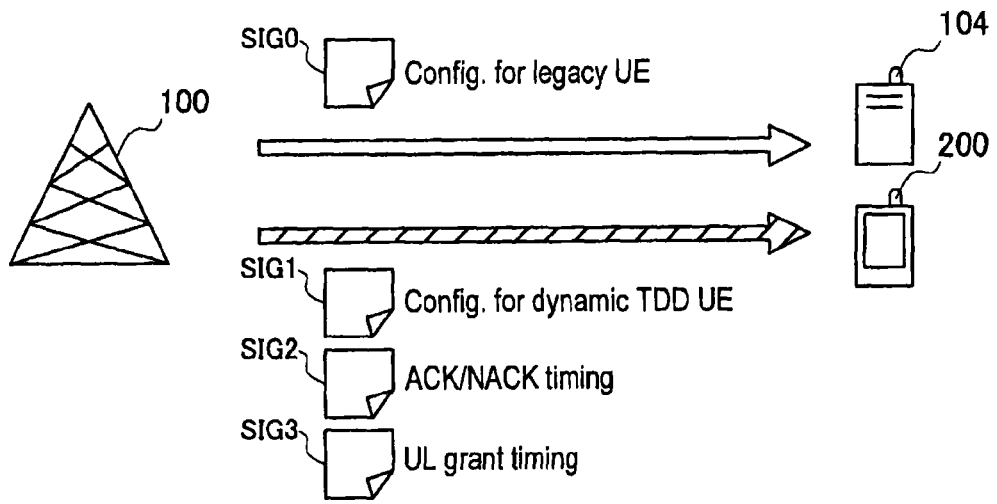
FIG. 9C is an explanatory diagram for describing a third example of new signaling.

FIG. 9C is an explanatory diagram for describing a third example of new signaling that may be introduced in the present embodiment. Referring to FIG. 9C, the base station 100 executes a signaling SIG0 directed towards the legacy terminal 104, as well as a signaling SIG1, a signaling SIG2, and a signaling SIG3 directed towards the dynamic TDD terminal 200.

In all of the examples in FIGS. 9A to 9C, it is sufficient to transmit the signaling SIG2 and SIG3 to the dynamic TDD terminal 200 just once, insofar as the timings of the control signaling are not modified. The trigger for the signaling SIG2 and SIG3 may be, for example, the dynamic TDD terminal 200 establishing a new connection to the base station 100 (including handover from another system), or the dynamic TDD terminal 200 returning from idle mode to active mode.

(2) Signaled Values (SIG0)

In the present embodiment, in each of the signaling SIG0 to SIG3, the base station 100 respectively specifies one from among a set of configuration candidates. The set of configuration candidates typically may include Configuration 0 to Configuration 6 exemplified in FIG. 2. The set of configuration candidates may be unique to the radio communication network, and in this case, some link direction configurations may be excluded from the set of configuration candidates.

In the signaling SIG0, typically a configuration candidate with a higher uplink ratio may be specified as the legacy configuration. For example, in the case in which Configuration 0 having the highest uplink ratio is specified as the legacy configuration, the legacy terminal 104 recognizes the 0th and 5th subframes as downlink subframes. Furthermore, the 0th and 5th subframe are maintained as downlink subframes, even if the base station 100 operates according to any of the other configurations. Consequently, the base station 100 transmits the CRS in subframes in which the legacy terminal 104 attempts to receive the CRS, thereby guaranteeing that the legacy terminal 104 will conduct synchronization tracking normally.

(3) Signaled Values (SIG1)

In the signaling SIG1, a configuration candidate selected according to the ratio between the uplink traffic and the downlink traffic on the network (the UL-DL traffic ratio) is specified as the dynamic TDD configuration. For example, in the case in which the set of configuration candidates includes Configuration 0 to Configuration 2, Configuration 0 may be specified when the ratio of uplink traffic is higher. In the same case, Configuration 2 may be specified when the ratio of downlink traffic is higher. In the same case, Configuration 1 may be specified when there is little difference between the ratio of uplink traffic and the ratio of downlink traffic. Monitoring of the UL-DL traffic ratio may be conducted on a time interval ranging from one to several radio frames (that is, from 10 ms to several tens of milliseconds), for example. The dynamic TDD configuration may also be selected on the basis of a prediction of a future UL-DL traffic ratio.

(4) Signaled Values (SIG2)

As discussed above, the signaling SIG2 informs the dynamic TDD terminal 200 of the transmission timing of an ACK/NACK associated with a downlink transmission. In the signaling SIG2, the base station 100 may specify a candidate with a higher downlink ratio from among the set of configuration candidates. Particularly, the signaling SIG2 preferably specifies a configuration candidate in which all subframes at positions that may become downlink subframes in other configuration candidates are defined as downlink subframes. For example, in the case in which the set of configuration candidates includes Configuration 0 to Configuration 6, the signaling SIG2 may specify Configuration 5.

Figure 10A:
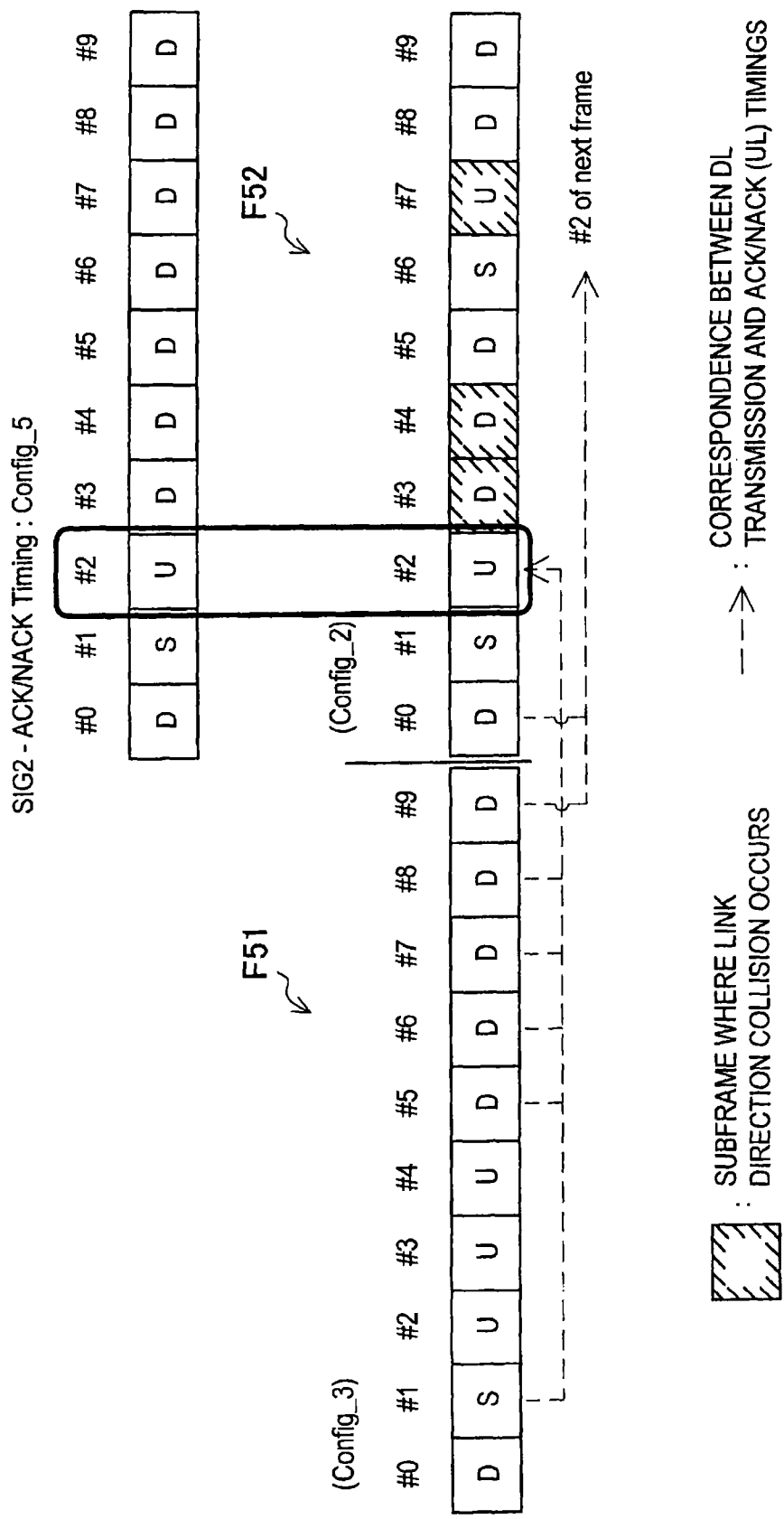
FIG. 10A is an explanatory diagram for describing a first example of a new ACK/NACK transmission timing.

FIG. 10A is an explanatory diagram for describing a first example of a new ACK/NACK transmission timing based on the signaling SIG2. In the example of FIG. 10A, the top part presupposes that Configuration 5 has been specified in the signaling SIG2. Meanwhile, the bottom part of FIG. 10A illustrates a radio frame F51 and the following radio frame F52. The dynamic TDD configuration configured in the radio frame F51 is Configuration 3. The dynamic TDD configuration configured in the radio frame F52 is Configuration 2. In this case, link direction collisions occur at the 3th, 4th, and 7th subframes. However, referring to the Configuration 5 row in Table 1, an ACK/NACK in response to a downlink transmission in any downlink subframe is transmitted in the 2nd subframe. Specifically, as indicated by the dashed arrows in the bottom part of FIG. 10A, an ACK/NACK in response to a downlink transmission in the 1st, 5th, 6th, 7th, and 8th downlink subframes of the radio frame F51 is transmitted in the 2nd uplink subframe of the radio frame F52. An ACK/NACK in response to a downlink transmission in the 9th downlink subframe of the radio frame F51 is transmitted in the 2nd uplink subframe of the next radio frame after the radio frame F52. An ACK/NACK in response to a downlink transmission in the 0th downlink subframe of the radio frame F52 is transmitted in the 2nd uplink subframe of the next radio frame after the radio frame F52. In addition, since link direction collisions do not occur in the uplink subframes in which these ACK/NACKs are transmitted, ACK/NACK loss caused by link direction collision is avoided.

Figure 10B:
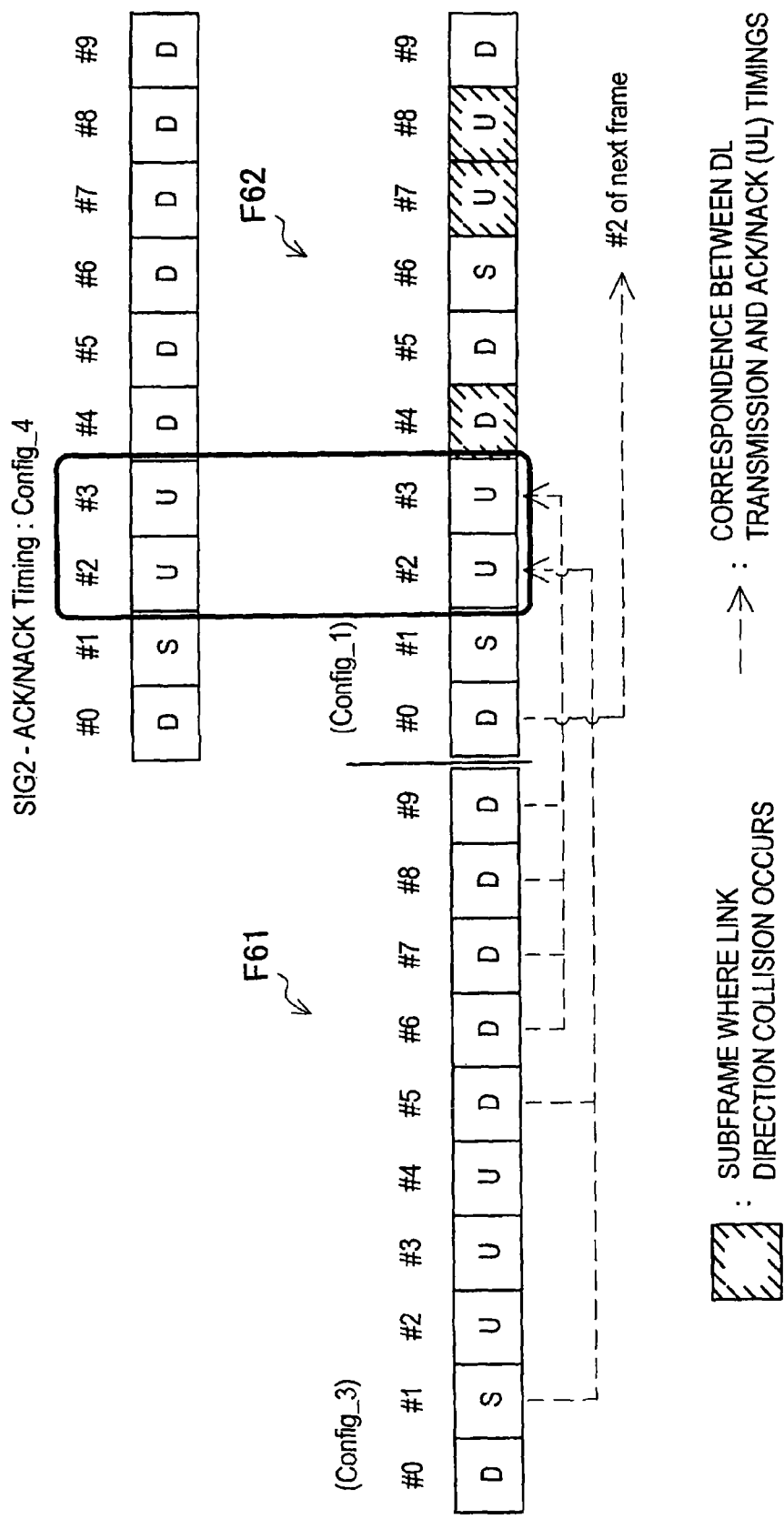
FIG. 10B is an explanatory diagram for describing a second example of a new ACK/NACK transmission timing.

FIG. 10B is an explanatory diagram for describing a second example of a new ACK/NACK transmission timing based on the signaling SIG2. In the example of FIG. 10B, the top part presupposes that Configuration 4 has been specified in the signaling SIG2. Meanwhile, the bottom part of FIG. 10B illustrates a radio frame F61 and the following radio frame F62. The dynamic TDD configuration configured in the radio frame F61 is Configuration 3. The dynamic TDD configuration configured in the radio frame F62 is Configuration 1. In this case, link direction collisions occur at the 4th, 7th, and 8th subframes. However, referring to the Configuration 4 row in Table 1, an ACK/NACK in response to a downlink transmission in any downlink subframe is transmitted in the 2nd or 3rd subframe. Specifically, as indicated by the dashed arrows in the bottom part of FIG. 10B, an ACK/NACK in response to a downlink transmission in the 1st and 5th downlink subframes of the radio frame F61 is transmitted in the 2nd uplink subframe of the radio frame F62. An ACK/NACK in response to a downlink transmission in the 6th, 7th, 8th, and 9th downlink subframes of the radio frame F61 is transmitted in the 3rd uplink subframe of the radio frame F62. An ACK/NACK in response to a downlink transmission in the 0th downlink subframe of the radio frame F62 is transmitted in the 2nd uplink subframe of the next radio frame after the radio frame F62. In addition, since link direction collisions do not occur in the uplink subframes in which these ACK/NACKs are transmitted, ACK/NACK loss caused by link direction collision is avoided. The example of FIG. 10B is effective in the case in which Configuration 5 or the like is excluded from the set of configuration candidates.

In this way, by deciding the ACK/NACK transmission timing on the basis of a specific configuration that may be signaled separately from the dynamic TDD configuration, it is possible to avoid ACK/NACK loss caused by link direction collision, and prevent lowered system throughput.

Note that the legacy terminal 104 does not receive the signaling SIG2, and operates according to the legacy configuration specified in the signaling SIG0 (Configuration 0, for example). Referring to the Configuration 0 row in Table 1, an ACK/NACK in response to a downlink transmission in the 6th subframe is transmitted in the 2nd subframe, which is an uplink subframe. Accordingly, by restricting scheduling so that a downlink transmission to the legacy terminal 104 is scheduled in the 6th subframe, the base station 100 is able to suitably receive an ACK/NACK in response to that downlink transmission.

(5) Signaled Values (SIG3)

As discussed above, the signaling SIG3 informs the dynamic TDD terminal 200 of the transmission timing of an uplink transmission associated with a UL grant. In the signaling SIG3, the base station 100 may specify a candidate with a higher uplink ratio from among the set of configuration candidates. Particularly, the signaling SIG3 preferably specifies a configuration candidate in which all subframes at positions that may become uplink subframes in other configuration candidates are defined as uplink subframes. For example, in the case in which the set of configuration candidates includes Configuration 0 to Configuration 6, the signaling SIG3 may specify Configuration 0.

FIG. 11A is an explanatory diagram for describing a first example of a new UL grant transmission timing based on the signaling SIG3. In the example of FIG. 11A, the top part presupposes that Configuration 0 has been specified in the signaling SIG3. Meanwhile, the bottom part of FIG. 11A illustrates a radio frame F71 and the following radio frame F72. The dynamic TDD configuration configured in the radio frame F71 is Configuration 0. The dynamic TDD configuration configured in the radio frame F72 is Configuration 4. In this case, link direction collisions occur at the 4th, 7th, 8th, and 9th subframes. However, referring to the Configuration 0 row in Table 2, a UL grant for an uplink transmission in any uplink subframe is transmitted in the 0th, 1st, 5th, or 6th subframe. The link direction of these four subframes is always downlink, irrespective of configuration. Specifically, as indicated by the dashed arrows in the bottom part of FIG. 11A, a UL grant for an uplink transmission in the 2nd and 3rd uplink subframes of the radio frame F72 is transmitted in the 6th downlink subframe of the radio frame F71. Link direction collisions do not occur in this downlink subframe in which a UL grant is transmitted.

FIG. 11B is an explanatory diagram for describing a second example of a new UL grant transmission timing based on the signaling SIG3. In the example of FIG. 11B, the top part presupposes that Configuration 6 has been specified in the signaling SIG3. Meanwhile, the bottom part of FIG. 11B illustrates a radio frame F81 and the following radio frame F82. The dynamic TDD configuration configured in the radio frame F81 is Configuration 1. The dynamic TDD configuration configured in the radio frame F82 is Configuration 3. In this case, link direction collisions occur at the 4th, 7th, and 8th subframes. However, referring to the Configuration 6 row in Table 2, and as indicated by the dashed arrows in the bottom part of FIG. 11B, a UL grant for an uplink transmission in the 2nd uplink subframe of the radio frame F82 is transmitted in the 5th downlink subframe of the radio frame F81. A UL grant for an uplink transmission in the 3rd uplink subframe of the radio frame F82 is transmitted in the 6th downlink subframe of the radio frame F81. A UL grant for an uplink transmission in the 4rd uplink subframe of the radio frame F82 is transmitted in the 9th downlink subframe of the radio frame F81. Link direction collisions do not occur in these downlink subframes in which a UL grant is transmitted. The example of FIG. 11B is effective in the case in which Configuration 0 or the like is excluded from the set of configuration candidates.

In this way, by deciding the UL grant transmission timing on the basis of a specific configuration that may be signaled separately from the dynamic TDD configuration, it is possible to avoid producing subframes that may go unused for uplink transmission, and prevent lowered system throughput.

Note that the legacy terminal 104 does not receive the signaling SIG3, and operates according to the legacy configuration specified in the signaling SIG0 (Configuration 0, for example). Referring to the Configuration 0 row in Table 2, a UL grant for an uplink transmission in any uplink subframe is transmitted in the 0th, 1st, 5th, or 6th subframe, which are always downlink subframes. Consequently, the base station 100 is able to suitably transmit a UL grant to the legacy terminal 104, without imposing special constraints on the scheduling of uplink transmissions from the legacy terminal 104.

Specific exemplary configurations of the communication control device (in the present embodiment, the base station 100) and the dynamic TDD terminal 200 implementing the basic principles described in this section will be described in the following sections.

[2-3. Exemplary Configuration of Communication Control Device]

Figure 12:
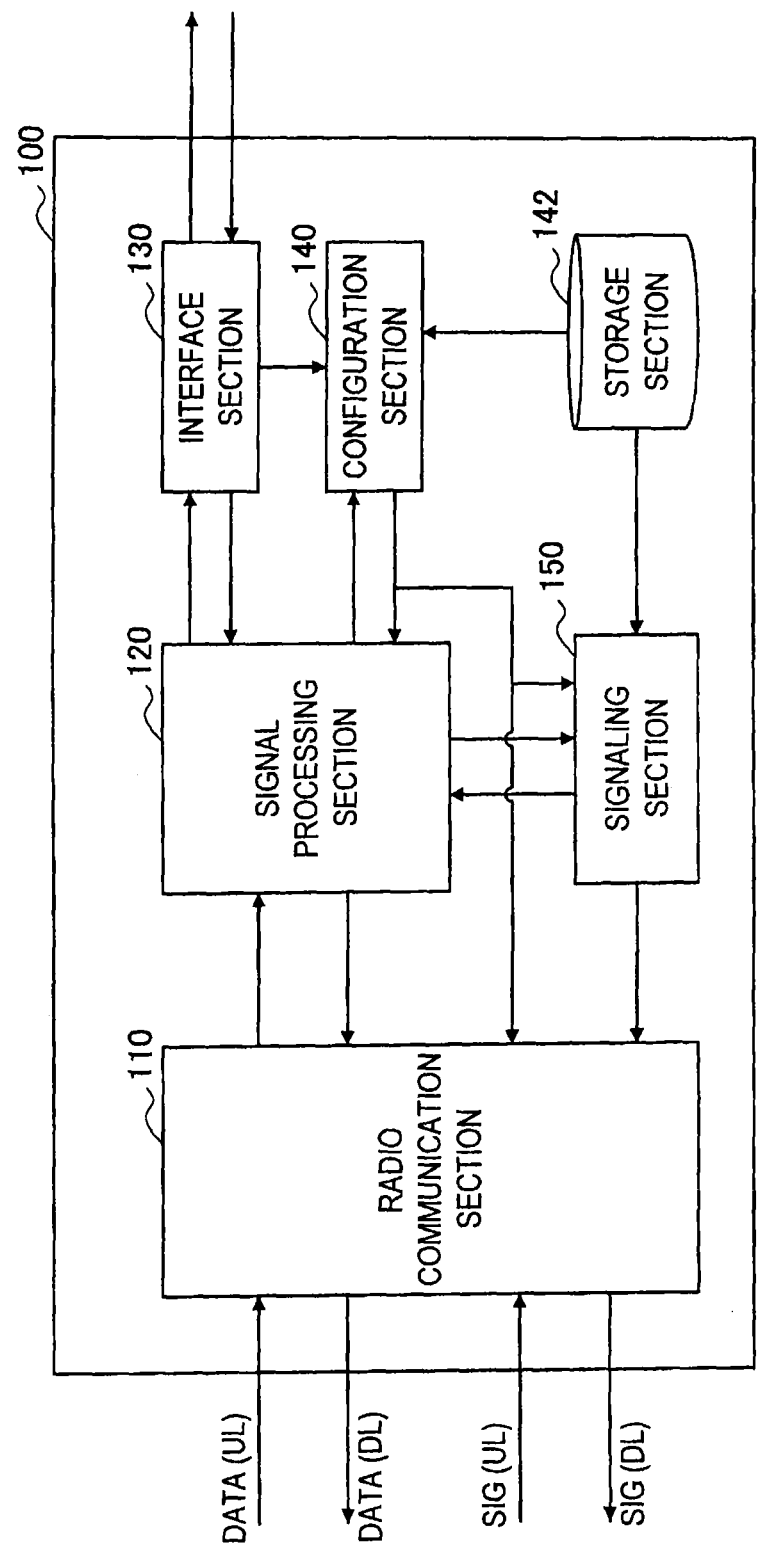
FIG. 12 is a block diagram illustrating an exemplary configuration of a communication control device according to an embodiment.

In the present embodiment, the base station 100 acts as a communication control device that controls radio communication conducted by a terminal device according to a time-division duplex (TDD) scheme. FIG. 12 is a block diagram illustrating an example of a configuration of the base station 100. Referring to FIG. 12, the base station 100 is equipped with a radio communication section 110, a signal processing section 120, an interface section 130, a configuration section 140, a storage section 142, and a signaling section 150.

(1) Radio Communication Section

The radio communication section 110 is a communication interface for transmitting and receiving radio signals between the base station 100 and one or more terminal devices. The radio communication section 110 includes one or more antennas (not illustrated) and an RF circuit. The radio communication section 110 receives an uplink signal transmitted from a terminal device, and conducts amplification, frequency conversion, and AD conversion of the received signal. In addition, the radio communication section 110 conducts DA conversion, frequency conversion, and amplification of a signal to be transmitted, and transmits a downlink signal to a terminal device.

An uplink signal received by the radio communication section 110 includes an uplink data signal and uplink signaling. The uplink signaling includes a buffer status report from each terminal device, as well as an ACK/NACK associated with a downlink transmission. In addition, a downlink signal transmitted by the radio communication section 110 includes a downlink data signal and downlink signaling. The downlink signaling may include a UL grant associated with an uplink transmission, as well as the signaling SIG0, SIG1, SIG2, and SIG3 discussed earlier.

(2) Signal Processing Section

The signal processing section 120 includes a signal processing circuit for conducting equalization, demodulation, and decoding of a received signal input from the radio communication section 110, as well as encoding and modulation of a signal to be transmitted that is output to the radio communication section 110. The signal processing section 120 outputs data included in a demodulated and decoded received signal to the interface section 130. Also, the signal processing section 120 encodes and modulates a signal to be transmitted that includes data input from the interface section 130.

(3) Interface Section

The interface section 130 includes an interface group such as the X2 interface by which the base station 100 communicates with other base stations, and the S1 interface by which the base station 100 communicates with a control node on the core network 106. Each communication interface in the interface section 130 may be a wired communication interface or a wireless communication interface. The interface section 130 receives buffer signaling from a P-GW, for example. Such buffer signaling indicates the traffic amount of buffered downlink data signals for each terminal device. The interface section 130 outputs received buffer signaling to the configuration section 140.

(4) Configuration Section

The configuration section 140 configures, for each frame that includes multiple subframes, a link direction configuration expressing a link direction per subframe for the purpose of radio communication inside the cell. More specifically, the configuration section 140 configures a legacy configuration for a first terminal group that includes one or more legacy terminals 104. In addition, the configuration section 140 configures a dynamic TDD configuration for a second terminal group that includes one or more dynamic TDD terminals 200. The radio communication section 110 operates according to a dynamic TDD configuration configured by the configuration section 140.

For example, the configuration section 140 may semi-permanently configure a predefined link direction configuration (Configuration 0, for example) as the legacy configuration. The link direction configuration configured as the legacy configuration may be defined so as to ensure normal synchronization tracking using the CRS by the legacy terminal 104.

In addition, the configuration section 140, on the basis of the most recent value or a predicted future value of the UL-DL traffic ratio, selects a dynamic TDD configuration to configure for each radio frame from among multiple configuration candidates. For example, if more uplink traffic is being buffered, the configuration section 140 may select a link direction configuration with a higher uplink ratio. Similarly, if more downlink traffic is being buffered, the configuration section 140 may select a link direction configuration with a higher downlink ratio. The set of configuration candidates that may be selected on a radio communication network may be all of the seven types of link direction configurations defined in Non-Patent Literature 1, or a subset unique to the network.

In addition, the configuration section 140 configures the timings of control signaling in a second link direction which is associated with data transmission in a first link direction of radio communication with a terminal device, and which is the opposite of the first link direction, independently of the configured dynamic TDD configuration. The control signaling referred to herein includes one or both of an ACK/NACK transmitted from a terminal device as a response to a downlink transmission, and a UL grant transmitted to a terminal device prior to an uplink transmission. In the present embodiment, the configuration section 140 configures the timings of the control signaling in a format that specifies one from among selectable configuration candidates.

For example, the configuration section 140 may specify a candidate with a higher downlink ratio from among the set of configuration candidates as the timing of an ACK/NACK in response to a downlink transmission. As a result, as described using FIGS. 10A and 10B, it is possible to avoid producing link direction collisions in uplink subframes in which an ACK/NACK is transmitted, even when the dynamic TDD configuration is updated. Both the base station 100 and the dynamic TDD terminal 200 store in advance a table that associates downlink transmission timings and ACK/NACK timings for each configuration candidate (see Table 1). Subsequently, the timing at which the dynamic TDD terminal 200 actually transmits an ACK/NACK is decided on the basis of an entry in that table corresponding to the configuration configured by the configuration section 140.

Additionally, the configuration section 140 may specify a candidate with a higher uplink ratio from among the set of configuration candidates as the timing of a UL grant preceding an uplink transmission. As a result, as described using FIGS. 11A and 11B, it is possible to decide a UL grant timing while avoiding producing subframes that go unused for uplink transmission, even when the dynamic TDD configuration is updated. Both the base station 100 and the dynamic TDD terminal 200 store in advance a table that associates uplink transmission timings and UL grant timings for each configuration candidate (see Table 2). Subsequently, the timing at which the radio communication section 110 actually transmits a UL grant is decided on the basis of an entry in that table corresponding to the configuration configured by the configuration section 140.

The storage section 142 is a storage medium that stores various parameters configured by the configuration section 140, as well as various data referenced when configuring these parameters. For example, the storage section 142 stores in advance a set of configuration candidates selectable by the base station 100. In addition, the storage section 142 stores a legacy configuration and a dynamic TDD configuration configured by the configuration section 140. In addition, the storage section 142 stores in advance a first table that associates downlink transmission timings and ACK/NACK timings, and a second table that associates uplink transmission timings and UL grant timings. In addition, the storage section 142 stores ACK/NACK timings and UL grant timings configured by the configuration section 140 in a format that specifies a configuration candidate number.

In the present embodiment, the configuration section 140 also acts as a scheduler. More specifically, the configuration section 140 schedules downlink transmissions from the base station 100 to each terminal device, and uplink transmissions from each terminal device to the base station 100. Furthermore, the configuration section 140 generates downlink assignments and uplink grants (UL grants) that indicate the scheduling results. Scheduling information is transmitted to each terminal device by the signaling section 150. The transmission timing of a UL grant is decided from the timing of a scheduled uplink transmission by referencing the entry of the configuration number specified for the purpose of UL grant timing inside the second table stored by the storage section 142.

(5) Signaling Section

The signaling section 150 signals a link direction configuration configured by the configuration section 140, and the timings of the control signaling discussed earlier (one or both of an ACK/NACK and a UL grant), to a terminal device via the radio communication section 110.

More specifically, on a signaling cycle C1, the signaling section 150 signals to the legacy terminal 104 a legacy configuration by broadcasting an SI message (SIG0). Also, on a signaling cycle C2 that is shorter than the signaling cycle C1, the signaling section 150 signals to the dynamic TDD terminal 200 a dynamic TDD configuration by transmitting a DC message (SIG1). At timings when the link direction configuration is not updated, transmission of an SI message or a DC message may be skipped.

Also, in the present embodiment, the signaling section 150 signals to the dynamic TDD terminal 200 the timing of an ACK/NACK in response to a downlink transmission by specifying a configuration number configured by the configuration section 140 (SIG2). Additionally, the signaling section 150 signals to the dynamic TDD terminal 200 the timing of a UL grant by specifying a configuration number configured by the configuration section 140 (SIG3). The signaling section 150 may also execute this signaling when the dynamic TDD terminal 200 connects to the base station 100 (which may include both establishing a new connection and returning to active mode). Additionally, the signaling section 150 may also execute this signaling periodically.

[2-4. Exemplary Configuration of Dynamic TDD Terminal]

Figure 13:
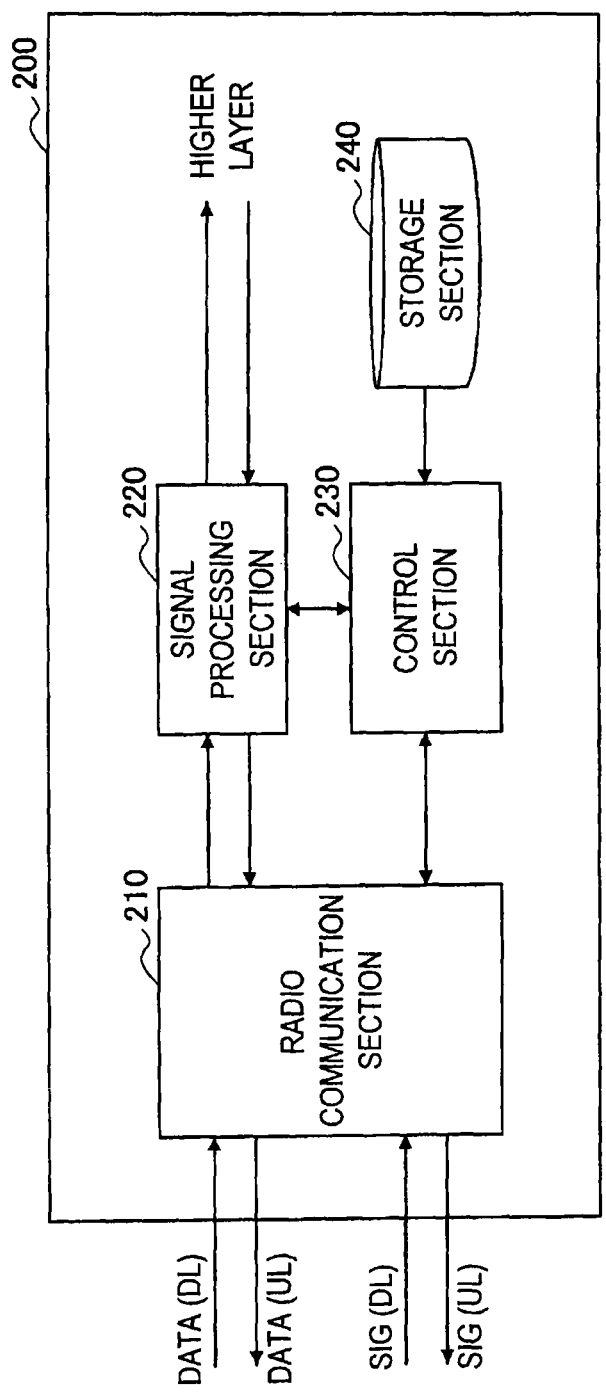
FIG. 13 is a block diagram illustrating an example of a configuration of a dynamic TDD terminal according to an embodiment.

FIG. 13 is a block diagram illustrating an exemplary configuration of a dynamic TDD terminal 200 according to the present embodiment. Referring to FIG. 13, the dynamic TDD terminal 200 is equipped with a radio communication section 210, a signal processing section 220, a control section 230, and a storage section 240.

(1) Radio Communication Section

The radio communication section 210 is a communication interface for transmitting and receiving radio signals between the dynamic TDD terminal 200 and the base station 100. The radio communication section 210 includes one or more antennas (not illustrated) and an RF circuit. The radio communication section 210 receives a downlink signal transmitted from the base station 100, and conducts amplification, frequency conversion, and AD conversion of the received signal. In addition, the radio communication section 210 conducts DA conversion, frequency conversion, and amplification of a signal to be transmitted, and transmits an uplink signal to the base station 100.

A downlink signal received by the radio communication section 210 includes a downlink data signal and downlink signaling. The downlink signaling may include a UL grant associated with an uplink transmission, as well as the signaling SIG1, SIG2, and SIG3 discussed earlier. Also, an uplink signal transmitted by the radio communication section 210 includes an uplink data signal and uplink signaling. The uplink signaling includes a buffer status report, as well as an ACK/NACK associated with a downlink transmission.

(2) Signal Processing Section

The signal processing section 220 includes a signal processing circuit for conducting equalization, demodulation, and decoding of a received signal input from the radio communication section 210, as well as encoding and modulation of a signal to be transmitted that is output to the radio communication section 210. The signal processing section 220 is connected to a processor (not illustrated) that realizes processing in a higher layer, for example. The signal processing section 220 then outputs data included in a demodulated and decoded received signal to a higher layer. Also, the signal processing section 220 encodes and modulates a signal to be transmitted that includes data input from a higher layer.

(3) Control Section

The control section 230 controls radio communication by the dynamic TDD terminal 200 according to the TD-LTE scheme. For example, the control section 230 configures link directions per subframe in the radio communication section 210 and the signal processing section 220 according to a dynamic TDD configuration specified in a DC message received from the base station 100. In addition, in a downlink subframe, the control section 230 causes the radio communication section 210 to receive the CRS and execute synchronization tracking. Also, the control section 230 periodically generates a buffer status report indicating the traffic amount of buffered uplink data signals, and transmits the generated buffer status report from the radio communication section 210 to the base station 100.

In addition, the control section 230 configures, on the basis of signaling from the base station 100, an offset between the timing of data transmission in a first link direction, and the timing of control signaling in a second link direction associated with that data transmission.

More specifically, the control section 230 configures, on the basis of the signaling SIG2 received from the base station 100, a timing offset between a downlink transmission and an ACK/NACK associated with that downlink transmission. The offset configured at this point is indicated by an entry specified by the signaling SIG2 in a first table that associates downlink transmission timings and ACK/NACK timings. The control section 230 then causes the radio communication section 210 to receive a downlink transmission according to a downlink assignment received by the radio communication section 210. Furthermore, the control section 230 decides individual ACK/NACK timings on the basis of the configured offset and downlink transmission timings. Subframes that correspond to an ACK/NACK timing decided in this way all become uplink subframes, irrespective of the dynamic TDD configuration. Consequently, the control section 230 does not have to make a link direction collision judgment for every downlink transmission, and operations that delay an ACK/NACK are also unnecessary.

Also, the control section 230 configures, on the basis of the signaling SIG3 received from the base station 100, a timing offset between an uplink transmission and a UL grant associated with that uplink transmission. The offset configured at this point is indicated by an entry specified by the signaling SIG3 in a second table that associates uplink transmission timings and UL grant timings. The control section 230 then causes the radio communication section 210 to transmit an uplink transmission according to a UL grant received by the radio communication section 210. There is a possibility that the timing of an uplink transmission may also correspond to one of the uplink subframes in the configured dynamic TDD configuration. In other words, since an uplink subframe with no possibility of being used does not exist, lowered radio resource utilization is avoided.

(4) Storage Section

The storage section 240 is a storage medium that stores data and programs used in order for the control section 230 to control radio communication by the dynamic TDD terminal 200. For example, the storage section 240 stores a dynamic TDD configuration configured by the control section 230. In addition, the storage section 240 stores in advance a first table that associates downlink transmission timings and ACK/NACK timings, and a second table that associates uplink transmission timings and UL grant timings. In addition, the storage section 240 stores ACK/NACK timings and UL grant timings configured by the control section 230 in a format that specifies a configuration candidate number.

(5) Dual Mode Support

Note that the dynamic TDD terminal 200 may also be capable of operating in both a first operating mode that configures link directions according to a legacy configuration similarly to a legacy terminal 104, and a second operating mode that configures link directions according to a dynamic TDD configuration on a shorter cycle. For example, the dynamic TDD terminal 200 may operate in the first operating mode during the stage of initial synchronization with a radio communication network, and afterwards transition to the second operating mode in response to receiving a DC message. According to such a configuration, after reliably establishing synchronization with the base station 100 according to an existing procedure, the dynamic TDD terminal 200 is able to flexibly exchange signaling with the base station 100 on various channels, and acquire a configuration for the second operating mode. Additionally, the dynamic TDD terminal 200 may infrequently receive an SI message (that is, the first operating mode) in idle mode (RRC_Idle), and frequently receive a DC message (that is, the second operating mode) in active mode (RRC_Connected). As a result, a rise in power consumption while in idle mode may be avoided.

3. PROCESS FLOW EXAMPLE

Figure 14B:
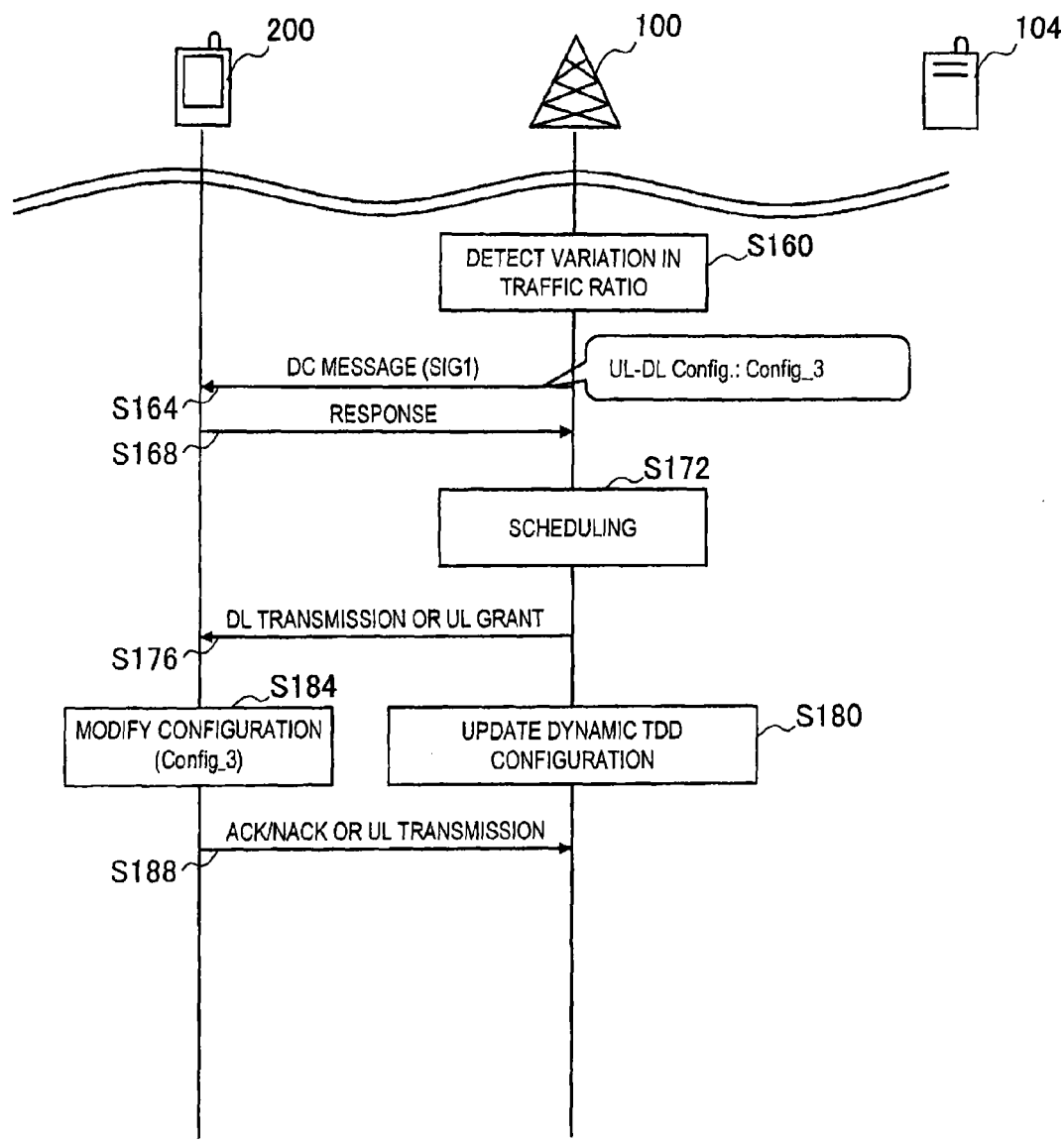
FIG. 14B is the second half of a sequence diagram illustrating an example of the flow of a process that may be executed in an embodiment.

FIGS. 14A and 14B are sequence diagrams illustrating an example of the flow of a process that may be executed in a communication control system 1 according to the present embodiment. Note that a base station 100, a legacy terminal 104, and a dynamic TDD terminal 200 participate in the process described herein. As an example, the dynamic TDD terminal 200 is assumed to be a terminal that supports the dual mode discussed above.

Referring to FIG. 14A, first, the base station 100 periodically broadcasts an SI message on a signaling cycle C1 (step S100). The SI message is a message that signals a legacy configuration, and specifies Configuration 0, for example. The legacy terminal 104 receives the SI message, and specifies Configuration 0 as the legacy configuration. The dynamic TDD terminal 200 likewise receives the SI message, and establishes initial synchronization with the base station 100 according to the legacy configuration (step S104).

The base station 100 collects data on the amount of uplink traffic buffered in the terminal devices and the amount of downlink traffic buffered on the core network, and monitors the UL-DL traffic ratio (step S108). Subsequently, the base station 100 configures a dynamic TDD configuration according to (the most recent value of, or a predicted future value of) the UL-DL traffic ratio (step S112).

The dynamic TDD terminal 200, having established initial synchronization with the base station 100, transmits a connection request to the base station 100 in an uplink subframe (step S116). The base station 100 accepts the connection from the dynamic TDD terminal 200 (step S120).

Next, the base station 100 transmits a capability query to the dynamic TDD terminal 200 (step S124). In response to receiving the query, the dynamic TDD terminal 200 responds to the base station 100, indicating that the device itself supports dynamic TDD (receiving the signaling SIG1, SIG2, and SIG3) (step S128).

Next, the base station 100 transmits a DC message to the dynamic TDD terminal 200 (step S132). The DC message is a message signaling a dynamic TDD configuration, and indicates the configuration number configured by the base station 100 in step S112. Herein, assume that the DC message also serves as the signaling SIG2 and SIG3, in addition to the signaling SIG1. In other words, the DC message specifies a configuration number for the timing of an ACK/NACK in response to a downlink transmission, as well as a configuration number for the timing of a UL grant. In the example of FIG. 14A, the dynamic TDD configuration is Configuration 2, the ACK/NACK timing is Configuration 5, and the UL grant timing is Configuration 0.

The dynamic TDD terminal 200, upon receiving the DC message from the base station 100 in step S132, replies with a response (step S136), and modifies the link direction configuration to the dynamic TDD configuration, that is, Configuration 2 (step S140). In addition, the dynamic TDD terminal 200 respectively stores Configuration 5 as the ACK/NACK timing, and Configuration 0 as the UL grant timing.

After that, if traffic for the dynamic TDD terminal 200 is produced, the base station 100 schedules the traffic (step S144). If the produced traffic is downlink traffic, the base station 100 transmits the downlink traffic to the dynamic TDD terminal 200 according to a downlink assignment (step S148). The dynamic TDD terminal 200 decides the transmission timing of an ACK/NACK in response to the downlink traffic on the basis of the configuration number signaled from the base station 100 in step S140 (Configuration 5), and transmits an ACK/NACK to the base station 100 at the decided timing (step S152).

On the other hand, if the produced traffic is uplink traffic, the base station 100 decides the transmission timing of a UL grant from the timing of an uplink transmission on the basis of the configuration number signaling to the dynamic TDD terminal 200 in step S140 (Configuration 0), and transmits a UL grant to the dynamic TDD terminal 200 at the decided timing (step S148). The dynamic TDD terminal 200 decides the timing of an uplink transmission for the UL grant on the basis of the configuration number signaled from the base station 100, and transmits uplink traffic to the base station 100 at the decided timing (step S152).

The sequence proceeds to FIG. 14B. Subsequently, suppose that the base station 100 detects variation in the UL-DL traffic ratio (step S160). At this point, the base station 100 decides to update the configuration of the dynamic TDD configuration according to the UL-DL traffic ratio. The base station 100 then transmits a DC message to the dynamic TDD terminal 200 (step S164). The dynamic TDD terminal 200 replies with a response (step S168). The DC message transmitted at this point is a message signaling the dynamic TDD configuration after a future update (in the example of FIG. 14B, Configuration 3).

Furthermore, suppose that before the dynamic TDD configuration is updated, traffic for the dynamic TDD terminal 200 is produced again. At this point, the base station 100 schedules the traffic (step S172). The base station 100 then transmits downlink traffic or a UL grant to the dynamic TDD terminal 200 (step S176).

After that, the base station 100 updates the configuration of the dynamic TDD configuration to the configuration signaled in step S164 (step S180). At the same time, the dynamic TDD terminal 200 likewise modifies the configuration of the dynamic TDD configuration to the configuration signaled from the base station 100 (step S184). However, the timing of an ACK/NACK associated with the downlink traffic or UL grant received in step S176 or an uplink transmission is unaffected by the update of the dynamic TDD configuration.

The dynamic TDD terminal 200 decides the transmission timing of an ACK/NACK or uplink traffic on the basis of the configuration number signaled from the base station 100 in step S140, and transmits the ACK/NACK or uplink traffic to the base station 100 at the decided timing (step S188).

4. CONCLUSION

The foregoing thus describes an embodiment of technology according to the present disclosure in detail using FIGS. 1 to 14B. According to the embodiment discussed above, the timing of control signaling in a second link direction associated with data transmission in a first link direction is configured independently of a link direction configuration configured for the purpose of radio communication in a time-division duplex (TDD) scheme. Consequently, it is possible to prevent lowered throughput caused by link direction collisions, while also eliminating the need for the load-heavy processing of making a link direction collision judgment every time the link direction configuration is updated.

In addition, according to the embodiment discussed above, the timing of the above control signaling is signaled to a terminal device separately from the link direction configuration configured according to the UL-DL traffic ratio. Consequently, a terminal device is able to suitably ascertain and expect the timings of mutually associated data transmissions and control signaling, irrespectively of link direction configuration updates.

In addition, according to the embodiment discussed above, the timing of the above control signaling is signaled in a format that specifies one from among multiple configuration candidates for the purpose of link direction configuration. Consequently, the number of signaled bits may be only several bits for a configuration number. For this reason, even if the new signaling described above is adopted, there is only a slight increase in signaling overhead. Also, the data defining the set of configuration candidates is data also held by legacy terminals. For this reason, existing data may be reused to easily realize the mechanism discussed above, without introducing additional data definitions.

In addition, according to the embodiment discussed above, the timing of the above control signaling may be signaled to a terminal device when that terminal device connects to a radio communication network. Consequently, even in the case of using a set of configuration candidates that is unique to a radio communication network, optimal control signaling timings for avoiding lowered throughput may be suitably reported to a terminal device.

Note that the series of control processes conducted by the devices described in this specification may be realized in any of software, hardware, and a combination of software and hardware. A program constituting software is stored in advance in a non-transitory medium provided internally or externally to each device, for example. Each program is then loaded into random access memory (RAM) at runtime and executed by a processor such as a central processing unit (CPU), for example.

The foregoing thus describes preferred embodiments of the present disclosure in detail and with reference to the attached drawings. However, the technical scope of the present disclosure is not limited to such examples. It is clear to persons ordinarily skilled in the technical field of the present disclosure that various modifications or alterations may occur insofar as they are within the scope of the technical ideas stated in the claims, and it is to be understood that such modifications or alterations obviously belong to the technical scope of the present disclosure.

Additionally, the present technology may also be configured as below.

(1)

A communication control device that controls radio communication conducted by a terminal device according to a time-division duplex (TDD) scheme on a radio communication network, the communication control device including:

a configuration section that configures, for each frame that includes a plurality of subframes, a link direction configuration expressing a link direction per subframe for the radio communication, wherein the configuration section configures a timing of control signaling in a second link direction which is associated with data transmission in a first link direction in the radio communication, and which is opposite to the first link direction, independently of the configured link direction configuration.

(2)

The communication control device according to (1), further including:

a signaling section that signals, to the terminal device, the link direction configuration and the timing configured by the configuration section.

(3)

The communication control device according to (2), wherein the configuration section configures the link direction configuration selected from a plurality of configuration candidates for the radio communication, and the signaling section signals the timing by specifying one from among the plurality of configuration candidates.

(4)

The communication control device according to (3), wherein the first link direction is downlink, and the second link direction is uplink, and the control signaling is an ACK/NACK transmitted from the terminal device as a response to a downlink transmission.

(5)

The communication control device according to (3), wherein the first link direction is uplink, and the second link direction is downlink, and the control signaling is an uplink grant transmitted to the terminal device prior to an uplink transmission.

(6)

The communication control device according to (4), wherein the signaling section specifies a candidate with a higher downlink ratio from among the plurality of configuration candidates.

(7)

The communication control device according to (5), wherein the signaling section specifies a candidate with a higher uplink ratio from among the plurality of configuration candidates.

(8)

The communication control device according to (6) or (7), further including:

a storage section that stores a table associating, for each configuration candidate, a timing of the data transmission with a timing of the control signaling, wherein one of the timing of the data transmission and the timing of the control signaling is decided on the basis of the other timing by referencing an entry for a specified configuration candidate in the table.

(9)

The communication control device according to any one of (3) to (8), wherein the configuration section selects the link direction configuration to be configured from the plurality of configuration candidates according to a ratio between uplink traffic and downlink traffic on the radio communication network.

(10)

The communication control device according to any one of (3) to (9), wherein the plurality of configuration candidates is unique to the radio communication network, and the signaling section signals the timing to the terminal device when the terminal device connects to the radio communication network.

(11)

The communication control device according to any one of (2) to (10), wherein the configuration section configures the link direction configuration for a first terminal group, and configures another link direction configuration for a second terminal group, and the signaling section signals the link direction configuration to a terminal device belonging to the first terminal group on a shorter cycle than a cycle of signaling to a terminal device belonging to the second terminal group.

(12)

The communication control device according to any one of (1) to (11), wherein the communication control device is a base station.

(13)

The communication control device according to any one of (1) to (11), wherein the communication control device is a control node that communicates with the terminal device via a base station.

(14)

A communication control method for controlling radio communication conducted by a terminal device according to a time-division duplex (TDD) scheme on a radio communication network, the communication control method including:

configuring, for each frame that includes a plurality of subframes, a link direction configuration expressing a link direction per subframe for the radio communication; and configuring a timing of control signaling in a second link direction which is associated with data transmission in a first link direction in the radio communication, and which is opposite to the first link direction, independently of the configured link direction configuration.

(15)

A program causing a computer of a communication control device that controls radio communication conducted by a terminal device according to a time-division duplex (TDD) scheme on a radio communication network to function as:

a configuration section that configures, for each frame that includes a plurality of subframes, a link direction configuration expressing a link direction per subframe for the radio communication, wherein the configuration section configures a timing of control signaling in a second link direction which is associated with data transmission in a first link direction in the radio communication, and which is opposite to the first link direction, independently of the configured link direction configuration.

(16)

A terminal device including:

a radio communication section that communicates with a base station according to a time-division duplex (TDD) scheme; and a control section that, according to a link direction configuration indicated by first signaling from the base station, configures a link direction per subframe for each frame that includes a plurality of subframes, wherein the control section configures, on the basis of second signaling from the base station, an offset between a timing of a data transmission in a first link direction and a timing of control signaling in a second link direction which is associated with the data transmission, and which is opposite to the first link direction.

(17)

A radio communication method executed by a terminal device provided with a radio communication section that communicates with a base station according to a time-division duplex (TDD) scheme, the radio communication method including:

configuring, according to a link direction configuration indicated by first signaling from the base station, a link direction per subframe for each frame that includes a plurality of subframes; and configuring, on the basis of second signaling from the base station, an offset between a timing of a data transmission in a first link direction and a timing of control signaling in a second link direction which is associated with the data transmission, and which is opposite to the first link direction.

(18)

A program causing a computer of a terminal device provided with a radio communication section that communicates with a base station according to a time-division duplex (TDD) scheme to function as:

a control section that, according to a link direction configuration indicated by first signaling from the base station, configures a link direction per subframe for each frame that includes a plurality of subframes, wherein the control section configures, on the basis of second signaling from the base station, an offset between a timing of a data transmission in a first link direction and a timing of control signaling in a second link direction which is associated with the data transmission, and which is opposite to the first link direction.

(19)

A communication control system including:

a terminal device that communicates with a base station according to a time-division duplex (TDD) scheme; and a communication control device that controls radio communication conducted by the terminal device, the communication control device including a configuration section that configures, for each frame that includes a plurality of subframes, a link direction configuration expressing a link direction per subframe for the radio communication, wherein the configuration section configures a timing of control signaling in a second link direction which is associated with data transmission in a first link direction in the radio communication, and which is opposite to the first link direction, independently of the configured link direction configuration.

REFERENCE SIGNS LIST 1 communication control system
100 communication control device
140 configuration section
142 storage section
150 signaling section
104 terminal device (legacy terminal)
200 terminal device (dynamic TDD terminal)
210 radio communication section
230 control section

The invention claimed is:

1. An electronic device comprising:
a communication interface configured to communicate with a base station according to a time-division duplex (TDD) scheme; and
circuitry configured to
configure a link direction per subframe for each frame that includes a plurality of subframes according to a first link direction configuration indicated by first signaling from the base station, the link direction configuration indicating an uplink (UL) or downlink (DL) direction for each subframe, wherein the first link direction configuration is configured to be changeable; and
configure a timing of a data transmission in a first link direction and a timing of control signaling associated with the data transmission in the first link direction in a second link direction which is opposite to the first link direction based on second signaling received from the base station indicating a second link direction configuration, wherein
the circuitry is configured to configure an offset between a timing of the data transmission in the first link direction and the timing of control signaling in the second link direction based on at least one available subframe in the second link direction identified by the second link direction configuration indicated by the second signaling received from the base station.

2. The electronic device of claim 1, wherein
the timing of the control signaling in the second link direction is configured independently of the first link direction configuration.

3. The electronic device of claim 1, wherein
the first link direction configuration is selected from a plurality of candidate link direction configurations.

4. The electronic device of claim 3, wherein
the plurality of candidate link direction configurations are unique to a radio communication network served by the base station; and
the circuitry is configured to receive an indication of the timing of control signaling from the base station when the electronic device connects to the radio communication network.

5. The electronic device of claim 1, wherein
the first link direction is DL and the second link direction is UL.

6. The electronic device of claim 5, wherein
the control signaling is an ACK/NACK transmitted by the electronic device in response to a DL transmission.

7. The electronic device of claim 6, wherein
the first link direction configuration has a higher DL ratio from among a plurality of link direction configuration candidates.

8. The electronic device of claim 6, wherein
the circuitry is configured to control transmitting the ACK/NACK to the base station in response to the DL transmission according to the timing of the control signaling indicated by the second signaling.

9. The electronic device of claim 1, wherein
the first link direction is UL and the link second direction is DL.

10. The electronic device of claim 9, wherein
the control signaling is an UL grant received by the electronic device prior to an UL transmission.

11. The electronic device of claim 10, wherein
the circuitry is configured to control transmitting the UL transmission to the base station according to the UL grant received from the base station.

12. The electronic device of claim 10, wherein
the first link direction configuration has a higher UL ratio from among a plurality of link direction configuration candidates.

13. The electronic device of claim 1, wherein
the circuitry is configured to store a table associating a timing of data transmission with a timing of the control signaling for each of a plurality of link direction configuration candidates.

14. The electronic device of claim 13, wherein
the circuitry is configured to determine at least one of the timing of the data transmission or the timing of the control signaling by referencing an entry for the first link direction configuration in the table.

15. The electronic device of claim 1, wherein
the first link direction configuration is selected from a plurality of link direction configuration candidates based on a ratio between UL traffic and DL traffic on a radio communication network served by the base station.

16. The electronic device of claim 1, wherein
the electronic device is a mobile terminal.

17. A method performed by an electronic device, the method comprising:
communicating with a base station according to a time-division duplex (TDD) scheme;
configuring a first link direction per subframe for each frame that includes a plurality of subframes according to a link direction configuration indicated by first signaling from the base station, the link direction configuration indicating an uplink (UL) or downlink (DL) direction for each subframe, wherein the first link direction configuration is configured to be changeable;
configuring a timing of a data transmission in a first link direction and a timing of control signaling associated with the data transmission in the first link direction in a second link direction which is opposite to the first link direction based on second signaling received from the base station indicating a second link direction configuration; and
configuring an offset between a timing of the data transmission in the first link direction and the timing of control signaling in the second link direction based on at least one available subframe in the second link direction identified by the second link direction configuration indicated by the second signaling received from the base station.

18. The method of claim 17, wherein
the timing of the control signaling in the second link direction is configured independently of the first link direction configuration.

19. The method of claim 18, wherein
the first link direction is DL and the second link direction is UL.

20. The method of claim 19, wherein
the control signaling is an ACK/NACK transmitted by the electronic device in response to a DL transmission.

21. The method of claim 20, further comprising:
transmitting the ACK/NACK to the base station in response to the DL transmission according to the timing of the control signaling indicated by the second signaling.

22. The method of claim 17, wherein the first link direction configuration is selected from a plurality of candidate link direction configurations.

23. The method of claim 17, wherein the first link direction is UL and the link second direction is DL.

24. The electronic device of claim 23, wherein the control signaling is an UL grant received by the electronic device prior to an UL transmission.

25. The electronic device of claim 24, further comprising: transmitting the UL transmission to the base station according to the UL grant received from the base station.

26. The method of claim 17, further comprising: determining the timing of the control signaling by referencing an entry for the first link direction configuration in a table indicating an association between the timing of the control signaling and the link direction configuration.

27. One or more non-transitory computer-readable media configured to store computer-readable instructions, which when executed by an electronic device, cause the electronic device to:

communicate with a base station according to a time-division duplex (TDD) scheme;

configure a first link direction per subframe for each frame that includes a plurality of subframes according to a link direction configuration indicated by first signaling from the base station, the link direction configuration indicating an uplink (UL) or downlink (DL) direction for each subframe, wherein the first link direction configuration is configured to be changeable;

configure a timing of a data transmission in a first link direction and a timing of control signaling associated with the data transmission in the first link direction in a second link direction which is opposite to the first link direction based on second signaling received from the base station indicating a second link direction configuration; and configure an offset between a timing of the data transmission in the first link direction and the timing of control signaling in the second link direction based on at least one available subframe in the second link direction identified by the second link direction configuration indicated by the second signaling received from the base station.

28. An electronic device comprising:

means for communicating with a base station according to a time-division duplex (TDD) scheme;

means for configuring a first link direction per subframe for each frame that includes a plurality of subframes according to a link direction configuration indicated by first signaling from the base station, the link direction configuration indicating an uplink (UL) or downlink (DL) direction for each subframe, wherein the first link direction configuration is configured to be changeable;

means for configuring a timing of a data transmission in a first link direction and a timing of control signaling associated with the data transmission in the first link direction in a second link direction which is opposite to the first link direction based on second signaling received from the base station indicating a second link direction configuration; and means for configuring an offset between a timing of the data transmission in the first link direction and the timing of control signaling in the second link direction based on at least one available subframe in the second link direction identified by the second link direction configuration indicated by the second signaling received from the base station.

* * * * *